US008576703B2

(12) United States Patent
Dholakia et al.

(10) Patent No.: US 8,576,703 B2
(45) Date of Patent: Nov. 5, 2013

(54) SYNCHRONIZATION OF MULTICAST INFORMATION USING BICASTING

(75) Inventors: Mehul Dholakia, Cupertino, CA (US); Wing-Keung Adam Yeung, Pleasanton, CA (US); Ajeer S. Pudiyapura, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 222 days.

(21) Appl. No.: 12/913,598

(22) Filed: Oct. 27, 2010

(65) Prior Publication Data

US 2011/0228771 A1    Sep. 22, 2011

Related U.S. Application Data

(60) Provisional application No. 61/315,808, filed on Mar. 19, 2010.

(51) Int. Cl.
*H04L 12/26* (2006.01)
*H04L 12/56* (2006.01)
*H04W 40/00* (2009.01)
*G06F 11/16* (2006.01)
*G06F 15/16* (2006.01)
*H04H 20/71* (2008.01)

(52) U.S. Cl.
USPC ........... 370/220; 370/312; 370/390; 370/432; 455/445; 709/208; 709/220; 709/230; 709/238; 714/4.11

(58) Field of Classification Search
USPC .................. 370/220, 312, 390, 432; 455/445; 709/208, 220, 230, 238; 714/4.11
See application file for complete search history.

(56) References Cited

U.S. PATENT DOCUMENTS

| 5,159,592 | A | 10/1992 | Perkins |
| 5,278,986 | A | 1/1994 | Jourdenais et al. |
| 5,410,710 | A | 4/1995 | Sarangdhar et al. |
| 5,550,816 | A | 8/1996 | Hardwick et al. |
| 5,649,110 | A | 7/1997 | Ben-Nun et al. |
| 5,878,232 | A | 3/1999 | Marimuthu |
| 5,970,232 | A | 10/1999 | Passint et al. |
| 5,978,578 | A | 11/1999 | Azarya et al. |
| 6,047,330 | A | 4/2000 | Stracke, Jr. |

(Continued)

FOREIGN PATENT DOCUMENTS

| EP | 0887731 A1 | 12/1998 |
| EP | 0926859 A | 6/1999 |
| EP | 1107511 A2 | 6/2001 |

OTHER PUBLICATIONS

Non-Final Office Action for U.S. Appl. No. 12/333,029, mailed on Mar. 30, 2012, 15 pages.

(Continued)

*Primary Examiner* — Alpus H Hsu
(74) *Attorney, Agent, or Firm* — Kilpatrick Townsend & Stockton LLP

(57) ABSTRACT

Techniques that enable a network device such as a router to provide multicast routing services without interruption. Techniques are provided for using bicasting to synchronize multicast information maintained by a first processor and multicast information maintained by a second processor. A multicast protocol related event of packet is sent to both a first processor operating in active mode and a second processor operating in standby mode. Each processor then updates its multicast information based upon the bicasted event or packet.

13 Claims, 10 Drawing Sheets

(56) References Cited

U.S. PATENT DOCUMENTS

| | | |
|---|---|---|
| 6,097,718 A | 8/2000 | Bion |
| 6,101,188 A | 8/2000 | Sekine et al. |
| 6,104,700 A | 8/2000 | Haddock et al. |
| 6,111,888 A | 8/2000 | Green et al. |
| 6,115,393 A | 9/2000 | Engel et al. |
| 6,161,169 A | 12/2000 | Cheng |
| 6,233,236 B1 | 5/2001 | Nelson et al. |
| 6,282,678 B1 | 8/2001 | Snay et al. |
| 6,331,983 B1 * | 12/2001 | Haggerty et al. ............ 370/400 |
| 6,374,292 B1 | 4/2002 | Srivastava et al. |
| 6,424,629 B1 | 7/2002 | Rubino et al. |
| 6,430,609 B1 | 8/2002 | Dewhurst et al. |
| 6,496,510 B1 | 12/2002 | Tsukakoshi et al. |
| 6,567,417 B2 | 5/2003 | Kalkunte et al. |
| 6,570,875 B1 | 5/2003 | Hegde |
| 6,577,634 B1 | 6/2003 | Tsukakoshi et al. |
| 6,580,727 B1 | 6/2003 | Yim et al. |
| 6,587,469 B1 | 7/2003 | Bragg |
| 6,597,699 B1 | 7/2003 | Ayres |
| 6,604,146 B1 | 8/2003 | Rempe et al. |
| 6,608,819 B1 | 8/2003 | Mitchem et al. |
| 6,633,916 B2 | 10/2003 | Kauffman |
| 6,636,895 B1 | 10/2003 | Li et al. |
| 6,674,756 B1 | 1/2004 | Rao et al. |
| 6,675,218 B1 | 1/2004 | Mahler et al. |
| 6,678,248 B1 | 1/2004 | Haddock et al. |
| 6,680,904 B1 * | 1/2004 | Kaplan et al. ............... 370/217 |
| 6,691,146 B1 | 2/2004 | Armstrong et al. |
| 6,763,023 B1 | 7/2004 | Gleeson et al. |
| 6,791,980 B1 | 9/2004 | Li |
| 6,847,638 B1 * | 1/2005 | Wu et al. ..................... 370/389 |
| 6,859,438 B2 | 2/2005 | Haddock et al. |
| 6,898,189 B1 | 5/2005 | Di Benedetto et al. |
| 6,910,148 B1 | 6/2005 | Ho et al. |
| 6,938,179 B2 | 8/2005 | Iyer et al. |
| 6,975,587 B1 | 12/2005 | Adamski et al. |
| 6,975,639 B1 | 12/2005 | Hill et al. |
| 7,039,720 B2 | 5/2006 | Alfieri et al. |
| 7,058,010 B2 | 6/2006 | Chidambaran et al. |
| 7,061,858 B1 | 6/2006 | Di Benedetto et al. |
| 7,065,059 B1 * | 6/2006 | Zinin ........................... 370/312 |
| 7,093,160 B2 | 8/2006 | Lau et al. |
| 7,188,237 B2 | 3/2007 | Zhou et al. |
| 7,194,652 B2 | 3/2007 | Zhou et al. |
| 7,236,453 B2 | 6/2007 | Visser et al. |
| 7,269,133 B2 | 9/2007 | Lu et al. |
| 7,284,236 B2 | 10/2007 | Zhou et al. |
| 7,292,535 B2 | 11/2007 | Folkes et al. |
| 7,305,492 B2 | 12/2007 | Bryers et al. |
| 7,308,503 B2 * | 12/2007 | Giraud et al. ................ 709/230 |
| 7,315,552 B2 | 1/2008 | Kalkunte et al. |
| 7,317,722 B2 * | 1/2008 | Aquino et al. ............... 370/390 |
| 7,324,500 B1 | 1/2008 | Blackmon et al. |
| 7,327,671 B2 * | 2/2008 | Karino et al. ................ 370/219 |
| 7,339,903 B2 * | 3/2008 | O'Neill ........................ 370/313 |
| 7,360,084 B1 | 4/2008 | Hardjono |
| 7,362,700 B2 | 4/2008 | Frick et al. |
| 7,382,736 B2 | 6/2008 | Mitchem et al. |
| 7,385,977 B2 * | 6/2008 | Wu et al. ..................... 370/389 |
| 7,406,037 B2 * | 7/2008 | Okita .......................... 370/218 |
| 7,417,947 B1 * | 8/2008 | Marques et al. ............. 370/220 |
| 7,417,990 B2 * | 8/2008 | Ikeda et al. .................. 370/390 |
| 7,441,017 B2 | 10/2008 | Watson et al. |
| 7,447,225 B2 * | 11/2008 | Windisch et al. ............ 370/428 |
| 7,483,370 B1 | 1/2009 | Dayal et al. |
| 7,483,433 B2 | 1/2009 | Simmons et al. |
| 7,518,986 B1 | 4/2009 | Chadalavada et al. |
| 7,522,521 B2 | 4/2009 | Bettink et al. |
| 7,535,826 B1 | 5/2009 | Cole et al. |
| 7,599,284 B1 | 10/2009 | Di Benedetto et al. |
| 7,609,617 B2 | 10/2009 | Appanna et al. |
| 7,620,953 B1 | 11/2009 | Tene et al. |
| 7,656,409 B2 | 2/2010 | Cool et al. |
| 7,694,298 B2 | 4/2010 | Goud et al. |
| 7,720,066 B2 * | 5/2010 | Weyman et al. ............. 370/390 |
| 7,729,296 B1 | 6/2010 | Choudhary |
| 7,739,360 B2 | 6/2010 | Watson et al. |
| 7,751,311 B2 * | 7/2010 | Ramaiah et al. ............. 370/218 |
| 7,787,360 B2 * | 8/2010 | Windisch et al. ............ 370/217 |
| 7,787,365 B1 * | 8/2010 | Marques et al. ............. 370/220 |
| 7,788,381 B2 | 8/2010 | Watson et al. |
| 7,802,073 B1 | 9/2010 | Cheng et al. |
| 7,804,769 B1 | 9/2010 | Tuplur et al. |
| 7,804,770 B2 | 9/2010 | Ng |
| 7,805,516 B2 | 9/2010 | Kettler et al. |
| 7,830,802 B2 * | 11/2010 | Huang et al. ................ 370/235 |
| 7,843,920 B2 * | 11/2010 | Karino et al. ................ 370/390 |
| 7,886,195 B2 | 2/2011 | Mayer |
| 7,894,334 B2 | 2/2011 | Wen et al. |
| 7,929,424 B2 | 4/2011 | Kochhar et al. |
| 7,940,650 B1 * | 5/2011 | Sandhir et al. .............. 370/219 |
| 7,944,811 B2 * | 5/2011 | Windisch et al. ............ 370/217 |
| 7,974,315 B2 | 7/2011 | Yan et al. |
| 8,009,671 B2 * | 8/2011 | Guo et al. .................... 370/390 |
| 8,014,394 B2 | 9/2011 | Ram |
| 8,028,290 B2 | 9/2011 | Rymarczyk et al. |
| 8,074,110 B2 | 12/2011 | Vera et al. |
| 8,086,906 B2 | 12/2011 | Ritz et al. |
| 8,089,964 B2 | 1/2012 | Lo et al. |
| 8,095,691 B2 | 1/2012 | Verdoorn, Jr. et al. |
| 8,099,625 B1 | 1/2012 | Tseng et al. |
| 8,102,848 B1 * | 1/2012 | Rao .............................. 370/390 |
| 8,121,025 B2 * | 2/2012 | Duan et al. ................... 370/218 |
| 8,149,691 B1 | 4/2012 | Chadalavada et al. |
| 8,156,230 B2 | 4/2012 | Bakke et al. |
| 8,180,923 B2 | 5/2012 | Smith et al. |
| 8,181,174 B2 | 5/2012 | Liu |
| 8,291,430 B2 | 10/2012 | Anand et al. |
| 8,335,219 B2 | 12/2012 | Simmons et al. |
| 8,345,536 B1 | 1/2013 | Rao et al. |
| 2002/0035641 A1 | 3/2002 | Kurose et al. |
| 2002/0103921 A1 | 8/2002 | Nair et al. |
| 2002/0129166 A1 | 9/2002 | Baxter et al. |
| 2003/0105794 A1 * | 6/2003 | Jasinschi et al. ............... 709/1 |
| 2003/0202520 A1 | 10/2003 | Witkowski et al. |
| 2004/0001485 A1 | 1/2004 | Frick et al. |
| 2004/0030766 A1 | 2/2004 | Witkowski |
| 2004/0078625 A1 | 4/2004 | Rampuria et al. |
| 2005/0036485 A1 | 2/2005 | Eilers et al. |
| 2005/0114846 A1 | 5/2005 | Banks et al. |
| 2005/0213498 A1 | 9/2005 | Appanna et al. |
| 2006/0002343 A1 | 1/2006 | Nain et al. |
| 2006/0004942 A1 | 1/2006 | Hetherington et al. |
| 2006/0018253 A1 | 1/2006 | Windisch et al. |
| 2006/0018333 A1 | 1/2006 | Windisch et al. |
| 2006/0090136 A1 | 4/2006 | Miller et al. |
| 2006/0171404 A1 | 8/2006 | Nalawade et al. |
| 2006/0176804 A1 * | 8/2006 | Shibata ........................ 370/217 |
| 2006/0224826 A1 | 10/2006 | Arai et al. |
| 2006/0274649 A1 * | 12/2006 | Scholl .......................... 370/218 |
| 2007/0027976 A1 * | 2/2007 | Sasame et al. ............... 709/223 |
| 2007/0036178 A1 | 2/2007 | Hares et al. |
| 2007/0076594 A1 | 4/2007 | Khan et al. |
| 2007/0162565 A1 | 7/2007 | Hanselmann |
| 2007/0189213 A1 * | 8/2007 | Karino et al. ................ 370/328 |
| 2008/0022410 A1 | 1/2008 | Diehl |
| 2008/0068986 A1 | 3/2008 | Maranhao et al. |
| 2008/0120518 A1 | 5/2008 | Ritz et al. |
| 2008/0159325 A1 * | 7/2008 | Chen et al. ................... 370/432 |
| 2008/0201603 A1 | 8/2008 | Ritz et al. |
| 2008/0225859 A1 | 9/2008 | Mitchem |
| 2008/0243773 A1 | 10/2008 | Patel et al. |
| 2008/0244222 A1 | 10/2008 | Supalov et al. |
| 2009/0028044 A1 | 1/2009 | Windisch et al. |
| 2009/0036152 A1 * | 2/2009 | Janneteau et al. ............ 455/503 |
| 2009/0080428 A1 | 3/2009 | Witkowski et al. |
| 2009/0086622 A1 | 4/2009 | Ng |
| 2009/0092135 A1 | 4/2009 | Simmons et al. |
| 2009/0094481 A1 | 4/2009 | Vera et al. |
| 2009/0219807 A1 | 9/2009 | Wang |
| 2009/0245248 A1 | 10/2009 | Arberg et al. |
| 2009/0316573 A1 * | 12/2009 | Lai .............................. 370/221 |
| 2010/0017643 A1 | 1/2010 | Baba et al. |
| 2010/0039932 A1 | 2/2010 | Wen et al. |

(56) References Cited

U.S. PATENT DOCUMENTS

| | | |
|---|---|---|
| 2010/0325381 A1 | 12/2010 | Heim |
| 2010/0325485 A1 | 12/2010 | Kamath et al. |
| 2011/0072327 A1 | 3/2011 | Schoppmeier et al. |
| 2011/0126196 A1 | 5/2011 | Cheung et al. |
| 2011/0228770 A1 | 9/2011 | Dholakia et al. |
| 2011/0228772 A1 | 9/2011 | Dholakia et al. |
| 2011/0228773 A1 | 9/2011 | Dholakia et al. |
| 2011/0231578 A1 | 9/2011 | Nagappan et al. |
| 2012/0023309 A1 | 1/2012 | Abraham et al. |
| 2012/0023319 A1 | 1/2012 | Chin et al. |

OTHER PUBLICATIONS

Non-Final Office Action for U.S. Appl. No. 12/626,432 mailed on Jul. 12, 2012, 13 pages.
Non-Final Office Action for U.S. Appl. No. 12/913,572 mailed on Aug. 3, 2012, 6 pages.
Non-Final Office Action for U.S. Appl. No. 12/823,073 mailed on Aug. 6, 2012, 21 pages.
Notice of Allowance for U.S. Appl. No. 12/333,029 mailed on Aug. 17, 2012, 7 pages.
CISCO Systems, Inc., "BGP Support for Nonstop Routing (NSR) with Stateful Switchover (SSO)." Mar. 20, 2006, pp. 1-18.
CISCO Systems, Inc., "Graceful Restart, Non Stop Routing and IGP routing protocol timer Manipulation," Copyright Jun. 2008, pp. 1-4.
CISCO Systems, Inc., "Intermediate System-to-Intermediate System (IS-IS) Support for Graceful Restart (GR) and Non-Stop Routing (NSR)," Copyright 2008, pp. 1-3.
CISCO Systems, Inc., "Internet Protocol Multicast," Internetworking Technologies Handbook, 2000, 3rd Edition, Chapter 43, pp. 43-1 through 43-16.
CISCO Systems, Inc., "Multicast Quick—Start Configuration Guide," Document ID:9356, Aug. 30, 2005, Copyright 2008-2009, 15 pages.
CISCO Systems, Inc., "Warm Reload," CISCO IOS Releases 12.3(2)T, 12.2(18)S, and 12.2(27)SBC, Copyright 2003, pp. 1-14.
Fenner, et al., "Protocol Independent Multicast—Sparse Mode (PIM-SM): Protocol Specification (Revised)." Network Working Group, RFC 4601, Aug. 2006, pp. 1-151.
Hardwick, "IP Multicast Explained," Metaswitch Networks, Jun. 2004, pp. 1-68.
IP Infusion Brochure, "ZebOS® Network Platform: Transporting You to Next Generation Networks," ip infusion™ An Access Company, Jun. 2008, pp. 1-6.
Kakadia, et al., "Enterprise Network Design Patterns: High Availability" Sun Microsystems, Inc., Sun BluePrints™ Online, Revision A, Nov. 26, 2003, pp. 1-35, at URL: http://www.sun.com/blueprints.
Kaplan, "Part 3 in the Reliability Series: NSR™ Non-Stop Routing Technology," White Paper, Avici Systems, Copyright 2002, pp. 1-8.
Khan, "IP Routing Use Cases," Cisco Press, Sep. 22, 2009, pp. 1-16, at URL: http://www.ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, pp. 523-528.
Pepelnjak, et al., "Using Multicast Domains," informIT, Jun. 27, 2003, pp. 1-29, at URL: http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, pp. 1-11.
Rodbell, "Protocol Independent Multicast—Sparse Mode," CommsDesign, Dec. 19, 2009, pp. 1-5, at URL: http://www.commsdesign.com/main/9811/9811standards.htm.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Non-Final Office Action for U.S. Appl. No. 12/842,936 mailed on Nov. 28, 2012, 12 pages.
Final Office Action for U.S. Appl. No. 12/626,432 mailed on Apr. 12, 2013, 14 pages.
Notice of Allowance for U.S. Appl. No. 12/913,650 mailed on Mar. 25, 2013, 6 pages.
Notice of Allowance for U.S. Appl. No. 12/842,936 mailed on Apr. 8, 2013, 6 pages.
U.S. Appl. No. 09/703,057, filed Oct. 31, 2000, Brewer et al.
U.S. Appl. No. 12/823,073, filed Jun. 24, 2010, Nagappan et al.
U.S. Appl. No. 12/913,572, filed Oct. 27, 2010, Dholakia et al.
U.S. Appl. No. 12/913,612, filed Oct. 27, 2010, Dholakia et al.
U.S. Appl. No. 12/913,650, filed Oct. 27, 2010, Dholakia et al.
Braden et al., "Integrated Services in the Internet Architecture: an Overview," Jul. 1994, RFC 1633, Network Working Group, pp. 1-28.
"Brocade Serveriron ADX 1000, 4000, and 8000 Series Frequently Asked Questions," pp. 1-10, Copyright 2009, Brocade Communications Systems, Inc.
Chen, "New Paradigm in Application Delivery Networking: Advanced Core Operating System (ACOS) and Multi-CPU Architecture—They Key to Achieving Availability, Scalability and Preformance." White Paper, May 2009, A10 Networks, 5 pages.
Cisco IP Routing Handbook, Copyright 2000; pp. 22-23, 119-135, and 405-406, M&T Books.
Demers et al., "Analysis and Simulation of a Fair Queueing Algorithm," Xerox PARC, Copyright 1989, pp. 1-12, ACM.
Extreme v. Enterasys WI Legal Transcript of Stephen R. Haddock, May 7, 2008, vol. 2, 2 pages.
Floyd et al., "Link-sharing and Resource Management Models for Packet Networks," IEEE/ACM Transactions on Networking, Aug. 1995, vol. 3, No. 4, Copyright 1995, IEEE, pp. 1-22.
Freescale Semiconductor, Inc., "Freescale's Embedded Hypervisor for QorIQ™ P4 Series Communications Platform," White Paper, Oct. 2008, Copyright 2008, pp. 1-8, Document No. EMHYPQIQTP4CPWP, Rev. 1.
Freescale Semiconductor, Inc., "Embedded Multicore: An Introduction," Jul., 2009, Copyright 2009, 73 pages, Document No. Embmcrm, Rev. 0.
"GIGAswitch FDDI System—Manager's Guide," Part No. EK-GGMGA-MG.B01, Jun. 1993 first printing, Apr. 1995 second printing, Copyright 1995, Digital Equipment Corporation, Maynard, MA, 113 pages.
"GIGAswitch System—Manager's Guide," Part No. EK-GGMGA-MG.A01, Jun. 1993, Copyright 1993, Digital Equipment Corporation, Maynard, MA, 237 pages.
Hemminger, "Delivering Advanced Application Acceleration & Security," Application Delivery Challenge, Jul. 2007, pp. 1-3.
Kaashok et al., "An Efficient Reliable Broadcast Protocol, " Operating System Review, Oct. 4, 1989, 15 pages.
Keshav, "An Engineering Approach to Computer Networking: ATM Networks; the internet, and the Telephone Network," Addison-Wesley Professional Computing Series, part 1 of 5, May 15, 1997, Copyright 1997 by AT&T, Addison-Wesley Publishing Company, pp. 1-129.
Keshav, "An Engineering Approach to Computer Networking: ATM Networks; the internet, and the Telephone Network," Addison-Wesley Professional Computing Series, part 2 of 5, May 15, 1997, Copyright 1997 by AT&T, Addison-Wesley Publishing Company, pp. 130-260.
Keshav, "An Engineering Approach to Computer Networking: ATM Networks; the internet, and the Telephone Network," Addison-Wesley Professional Computing Series, part 3 of 5, May 15, 1997, Copyright 1997 by AT&T, Addison-Wesley Publishing Company, pp. 261-389.
Keshav, "An Engineering Approach to Computer Networking: ATM Networks; the internet, and the Telephone Network," Addison-

(56) References Cited

OTHER PUBLICATIONS

Wesley Professional Computing Series, part 4 of 5, May 15, 1997, Copyright 1997 by AT&T, Addison-Wesley Publishing Company, pp. 390-519.

Keshav, "An Engineering Approach to Computer Networking: Atm Networks; the Internet, and the Telephone Network," Addison-Wesley Professional Computing Series, part 5 of 5, May 15, 1997, Copyright 1997 by AT&T, Addison-Wesley Publishing Company, pp. 520-660.

May, et al., "An Experimental Implementation of Traffic Control for IP Networks," 1993, Sophia-Antipolis Cedex, France, 11 pages.

Moy, "OSPF Version 2," Network Working Group, RF 2328, Apr. 1998, 204 pages.

Order Granting/Denying Request for Ex Parte Reexamination for U.S. Appl. No. 90/010,432, mailed on May 21, 2009, 18 pages.

Order Granting/Denying Request for Ex Parte Reexamination for U.S. Appl. No. 90/010,433, mailed on May 22, 2009, 15 pages.

Order Granting/Denying Request for Ex Parte Reexamination for U.S. Appl. No. 90/010,434, mailed on May 22, 2009, 20 pages.

Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri . . . .

Partridge, "A Proposed Flow Specification," Sep. 1992, RFC 1363, Network Working Group, pp. 1-20.

Riggsbee, "From ADC to Web Security, Serving the Online Community," Blog Posting, Jul. 2009, 2 pages, printed on Dec. 22, 2009, at URL: http://community.brocade.com/home/community/brocadeblogs/wingspan/blog/2009/07/0 . . . .

Riggsbee, "You've Been Warned, the Revolution Will Not Be Televised," Blog Posting, Jul. 2009, 2 pages, printed on Dec. 22, 2009, at URL: http://community.brocade.com/home/community/brocadeblogs/wingspan/blog/2009/07/0 . . . .

Schlansker, et al., "High-Performance Ethernet-Based Communications for Future Multi-Core Processors," SCO7 Nov. 10-16, 2007, 12 paes, Copyright 2007, ACM.

TCP/IP Illustrated, vol. 2: The Implementation, Gray R. Wright and W. Richard Stevens, Addison-Wesley 1995, pp. 64, 97, 128,158,186,207,248,277,305,340,383,398,437,476,572,680,715, 756,797,1028, and 1051.

Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, pp. 404-409.

European Search Report for Application No. EP 02254403, dated Mar. 18, 2003, 3 pages.

European Search Report for Application No. EP 02256444, dated Feb. 23, 2005, 3 pages.

Non-Final Office Action for U.S. Appl. No. 09/896,228, mailed on Jul. 29, 2005, 17 pages.

Non-Final Office Action for U.S. Appl. No. 09/896,228, mailed on Sep. 7, 2006, 17 pages.

Non-Final Office Action for U.S. Appl. No. 09/896,228, mailed on Mar. 5, 2007, 14 pages.

Final Office Action for U.S. Appl. No. 09/896,228, mailed Aug. 21, 2007, 15 pages.

Notice of Allowance for U.S. Appl. No. 09/896,228, mailed on Jun. 17, 2008, 20 pages.

Non-Final Office Action for U.S. Appl. No. 09/953,714, mailed on Dec. 21, 2004, 16 pages.

Final Office Action for U.S. Appl. No. 09/953,714, mailed on Jun. 28, 2005, 17 pages.

Non-Final Office Action for U.S. Appl. No. 09/953,714, mailed on Jan. 26, 2006, 15 pages.

Final Office Action for U.S. Appl. No. 09/953,714, mailed on Aug. 17, 2006, 17 pages.

Notice of Allowance for U.S. Appl. No. 09/953,714, mailed on Sep. 14, 2009, 6 pages.

Notice of Allowance for U.S. Appl. No. 09/953,714, mailed on Feb. 5, 2010, 10 pages.

Non-Final Office Action for U.S. Appl. No. 12/333,029, mailed on May 27, 2010, 29 pages.

Non-Final Office Action for U.S. Appl. No. 12/210,957, mailed on Sep. 2, 2009, 16 pages.

Notice of Allowance for U.S. Appl. No. 12/210,957, mailed on Feb. 4, 2010, 10 pages.

\* cited by examiner

SYNCHRONIZATION OF MULTICAST INFORMATION USING BICASTING

CROSS-REFERENCES TO RELATED APPLICATIONS

The present application is a non-provisional of and claims the benefit and priority under 35 U.S.C. 119(e) of U.S. Provisional Application No. 61/315,808, filed Mar. 19, 2010, entitled HITLESS UPGRADES FOR MULTICAST, the entire contents of which are incorporated herein by reference for all purposes.

This application also incorporates by reference for all purposes the entire contents of the following related and commonly-assigned non-provisional applications, all filed on Oct. 27, 2010 concurrently with the present application:
(1) U.S. application Ser. No. 12/913,572, entitled SYNCHRONIZATION OF MULTICAST INFORMATION USING INCREMENTAL UPDATES, now U.S. Publication No. 2011/0228770, published on Sep. 22, 2011;
(2) U.S. application Ser. No. 12/913,612, entitled PROVIDING MULTICAST SERVICES WITHOUT INTERRUPTION UPON A SWITCHOVER, now U.S. Publication No. 2011/0228772, published on Sep. 22, 2011; and
(3) U.S. application Ser. No. 12/913,650, entitled SYNCHRONIZING MULTICAST INFORMATION FOR LINECARDS, now U.S. Publication No. 2011/0228773, published on Sep. 22, 2011.

BACKGROUND

Embodiments of the present invention relate to networking and more particularly to techniques for supporting hitless or non-stop routing (NSR) capability for multicast routing.

Multicast routing protocols are used to distribute data to multiple recipients. IP multicasting enables a sender device (or sender host) to send a packet to a set of recipients. The set of recipients is referred to as a multicast group and is represented by an IP address referred to as the multicast address. A multicast address thus corresponds to or represents a group of IP hosts that have joined the multicast group and want to receive packets whose destination address is the multicast address. By specifying a multicast address as the destination address for a packet (referred to as a multicast packet or multicast IP datagram), the packet is then delivered to the zero or more members (receivers) of the multicast group.

The membership of a multicast group is dynamic—hosts may join and leave multicast groups at any time. There is typically no restriction on the location or number of members in a multicast group. An IP host may be a member of more than one multicast group at a time. A host need not be a member of a group to be able to send multicast packets. Internet Group Membership Protocol (IGMP) is an example of a protocol that facilitates formation and management of multicast groups. Hosts may use IGMP to join or leave multicast groups. Hosts may also use IGMP to advertise their membership in a multicast group.

Forwarding of multicast packets from senders to receivers is performed by a fabric of network devices (e.g., routers, switches) that execute a multicast routing protocol. For example, multicast routing may be performed using Protocol Independent Multicast (PIM), which is a collection of multicast routing protocols including protocols such as PIM Sparse-Mode, PIM dense Mode, Bi-directional PIM, and others. PIM and its variants provide a set of protocols that can be used by network devices such as routers providing multicast routing services to distribute information about multicast group membership.

Network devices such as routers that are configured to perform multicast routing are also referred to as multicast routers. A multicast router typically maintains multicast state information (also referred to as multicast information) that is used by the router to forward a multicast packet to its multicast group receivers.

In order to reduce the down-time, several network devices provide redundant components such as redundant management processors (MPs) that are configured to facilitate data forwarding performed by the network device. In a router with redundant MPs, at any point in time, one of the MPs is configured to operate in active mode while the other MP operates in standby mode. The MP operating in standby mode thus provides redundancy. Various events during the operation of the router may cause a switchover (also sometimes referred to as a failover), which causes the standby MP to become the active MP and takes over data forwarding functions, including multicast forwarding functions, from the previous active MP. The previous active MP may become the standby MP as a result of the switchover.

When a switchover occurs, the new active MP has to rebuild its multicast state information from scratch. This rebuilding or restoring of the multicast state can take several seconds or even minutes, during which all line-rate multicast traffic is interrupted until the multicast state information has been rebuilt by the new active MP.

The building of multicast state information by a network device such as a router is also dependent upon receiving information from the network device's neighboring network devices. This further delays the restoration of the multicast state information thereby further adding to the down time of the network device. For example, according to the PIM protocol, PIM neighbors periodically exchange PIM hello messages to monitor the status of neighboring devices. Each PIM hello packet comprises a GenID (per RFC 4601), which is used to indicate to a network device's neighbors when a change of state has occurred in the network device (e.g., due to a switchover or failover). For example, when a switchover occurs in a router causing a new active management processor to take over, the new active management processor modifies the GenID and sends PIM hello packets with the new GenID to its neighbors. When a neighbor detects a PIM hello packet with a new GenID, it sends its multicast information to the sender of the hello packets. The multicast information may include information related to (*, G) and (S, G) multicast routes. The new active management processor then uses the multicast information received from its neighbors to build its multicast forwarding state. This process can take time during which multicast routing services provided by the router are interrupted. Further, in order to be able to build its multicast state, the router imposes a requirement that its neighboring network devices support GenID processing.

BRIEF SUMMARY

Embodiments of the present invention provide various techniques that enable a network device such as a router to provide multicast routing services without interruption. These techniques enable the network device to provide non-stop routing (NSR) capability for multicast routing even in the event of a switchover. In one embodiment, the line rate for multicast data forwarding is sustained even during a switchover.

In one embodiment, techniques are provided for using bicasting to synchronize multicast information maintained by a first processor and multicast information maintained by a second processor. A multicast protocol related event of packet is sent to both a first processor operating in active mode and a second processor operating in standby mode. Each processor then updates its multicast information based upon the bicasted event or packet.

In one embodiment, a network device may comprise a first processor operating in active mode and a second processor operating in standby mode. The first processor may perform a set of multicast routing-related functions in the active mode, which are not performed by the second processor operating in the standby mode. The network device may receive a multicast protocol-related packet. The packet is then bicasted to the first processor and the second processor. As a result of bicasting, both the first processor and the second processor receive a copy of the multicast protocol-related packet. The first processor is configured to update first multicast information maintained by the first processor based upon the copy of the multicast protocol-related packet received by the first processor. The second processor is configured to update second multicast information maintained by the second processor based upon the copy of the multicast protocol-related packet received by the second processor. Examples of multicast protocol-related packets include a Protocol Independent Multicast (PIM) packet, an Internet Group Membership Protocol (IGMP) packet, and the like.

In one embodiment, the network device also comprises a linecard. The multicast protocol packet is received by the linecard. The linecard is configured to sending a copy of the multicast protocol-related packet to the first processor and a copy to the second processor. In one embodiment, the first multicast information updated by the first processor comprises information related to neighbors of the network device that support PIM protocol. The first multicast information updated by the first processor may also comprise information related to IGMP.

In one embodiment, update information may be communicated from the first processor to the second processor, the update information comprising information indicative of a change made to the first multicast information. The second multicast information may be based upon the update information.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide various techniques that enable a network device such as a router to provide multicast routing services without interruption. The techniques described herein enable the network device to provide non-interrupted or non-stop routing (NSR) capability for multicast traffic even in the event of a switchover. The line rate for multicast data forwarding is sustained even after a switchover.

Figure 1:
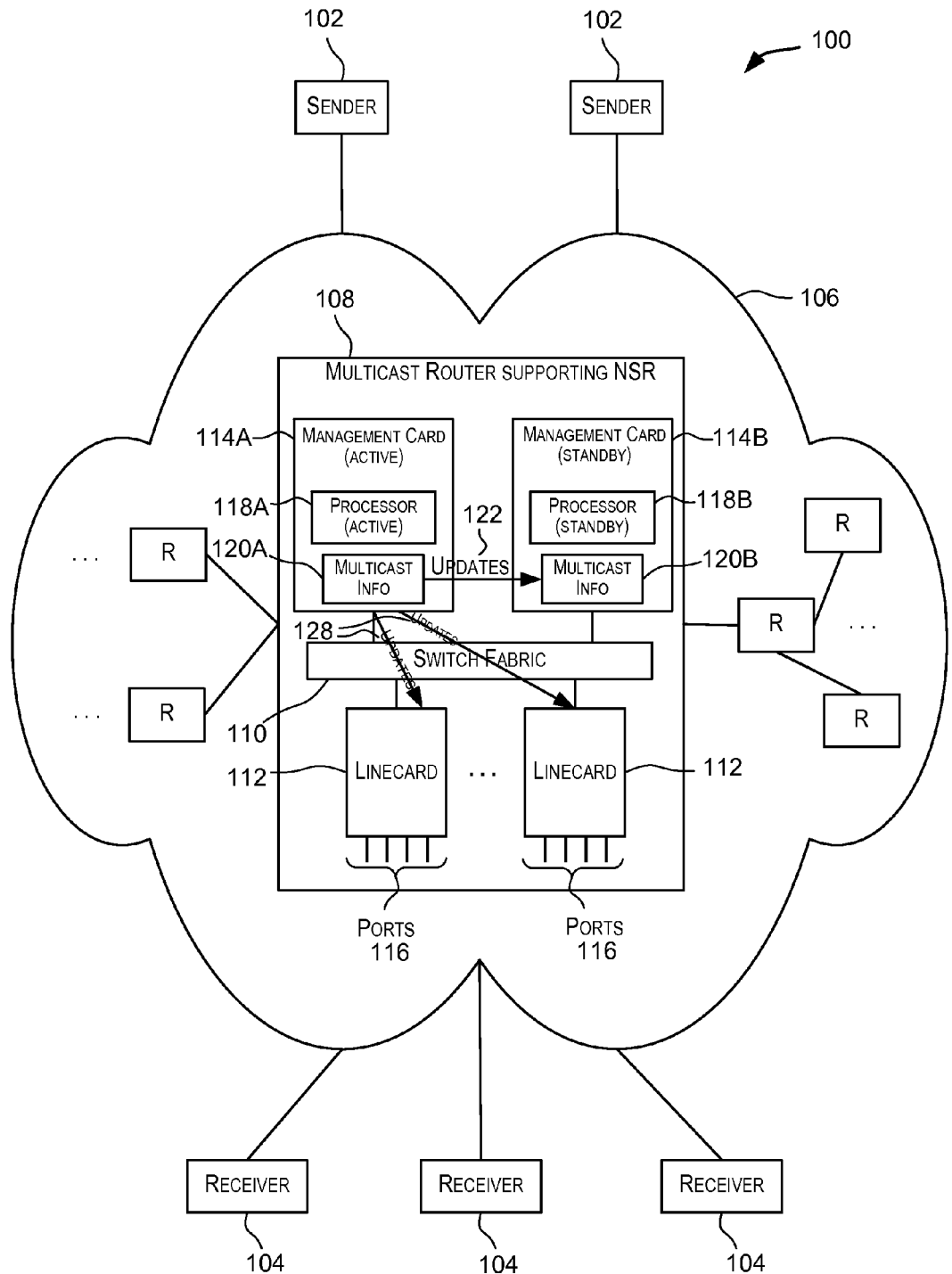
FIG. 1 is a simplified block diagram of a network environment that may incorporate an embodiment of the present invention.

FIG. 1 is a simplified block diagram of a network environment 100 that may incorporate an embodiment of the present invention. As shown, network environment 100 comprises multiple hosts communicatively coupled to each other via network 106. The hosts may include one or more senders 102 and multiple receivers 104. Network 106 may comprise various network devices that are configured to forward data so as to facilitate communication of data from a sender 102 to one or more receivers 104. Examples of such network devices include but are not limited to routers (denoted by "R"), switches, and the like. One or more network devices in network 106 may be configured to perform multicast packet forwarding. For example, a router 108 (referred to as a multicast router) may be configured to execute a multicast routing protocol and provide multicast routing services. The multicast routing services include services and functions related to facilitating routing of multicast data. In one embodiment, router 108 provides non-stop routing (NSR) capability for multicast routing even in the event a switchover occurs. Router 108 may be a router or other network device provided by Brocade Communications Systems, Inc.

Various different communication protocols may be used to facilitate forwarding of packets from senders 102 to receivers 104 including one or more unicast forwarding protocols and multicast protocols. The multicast protocols supported may include the PIM protocol, which is a collection of multicast routing protocols including protocols such as PIM Sparse-Mode, PIM dense Mode, Bi-directional PIM, and others. For example, in one embodiment, multicast router 108 may execute the PIM protocol to facilitate multicast routing. The protocols used in network 106 may include wired and/or wireless protocols. While embodiments have been described below using the PIM protocol, other multicast protocols are also included within the scope of embodiments of the present invention.

In FIG. 1, senders 102 originate data traffic that is then forwarded to one or more receivers 104. For example, a sender 102 may originate multicast data traffic addressed to a multicast group. The multicast traffic is then forwarded by the routers and other network devices in network 106 to the data's intended one or more receivers 104. In multicasting, a packet originating at a sender and having a destination address that is a multicast address corresponding to a multicast group is delivered to zero or more receivers 104 that are members of that multicast group. The sender need not be a member of a multicast group in order to send multicast data. A receiver 104 may be a member of one or more multicast groups. A receiver 104 may use a protocol such as IGMP to join or leave a multicast group or to advertise the receiver's membership in a multicast group.

Multicast router 108 is configured to receive packets, including unicast and multicast packets, and forward the packets in such a way that it facilitates delivery of the packets to their intended one or multiple destinations. For a multicast packet, router 108 may be configured to replicate the packet depending upon the number of recipients of the packet and forward the replicates to facilitate delivery of the packets to members of the multicast group corresponding to the packet's multicast destination address.

A simplified block diagram of a multicast router 108 is depicted in FIG. 1. As shown, router 108 comprises a plurality of ports 116 for receiving and forwarding data packets and multiple cards that are configured to perform processing to facilitate forwarding of the data packets. In one embodiment, a card, sometimes also referred to as a blade or module, can be inserted into one of a plurality of slots on a chassis of router 108. This modular design allows for flexible configurations with different combinations of cards in the various slots of the device according to differing network topologies and switching requirements. The multiple cards may include one or more line cards 112 and one or more management cards 114 coupled to one another via switch fabric 110 (sometimes also referred to as a backplane). The embodiment depicted in FIG. 1 comprises two management cards 114A and 114B thereby providing redundancy.

The components of router 108 depicted in FIG. 1 are meant for illustrative purposes only and are not intended to limit the scope of the invention in any manner. Alternative embodiments may have more or fewer components than those shown in FIG. 1. For example, in one alternative embodiment, instead of having two management cards, two MPs may be located on the same management card. In alternative embodiments, more than two MPs may be provided.

Ports 116 represent the I/O plane of router 108. Router 108 is configured to receive and forward data, including unicast and multicast packets, using ports 116. A port within ports 116 may be classified as an input port or an output port depending upon whether router 108 receives or transmits a packet using the port. A port over which a packet is received by router 108 is referred to as an input port. A port used for communicating or forwarding a packet from router 108 is referred to as an output port. A particular port may function both as an input port and an output port. A port may be connected by a link or interface to a neighboring network device or network. Ports 116 may be capable of receiving and/or transmitting different types of data traffic including multicast data traffic at different speeds including 1 Gigabit/sec, 10 Gigabits/sec, 40 Gigabits/sec, or more. In some embodiments, multiple ports of router 108 may be logically grouped into one or more trunks.

Linecards 112 represent the data forwarding plane of router 108. Each linecard 112 may be coupled to one or more ports 116. A linecard coupled to an input port is referred to as an ingress linecard and a linecard coupled to an output port is referred to as an egress linecard. A linecard may serve as both the ingress linecard and the egress linecard for a packet. Upon receiving a packet via an input port, router 108 performs processing to determine an output port for transmitting the packet from router 108 to facilitate delivery of the packet to its intended recipient. The packet is then forwarded from the input port to the determined output port and then forwarded from router 108 using the output port. In one embodiment, as part of the processing, the ingress linecard is configured to determine an output port for a received packet within router 108. The output port may be coupled to the ingress linecard itself or to some other linecard. In the case where the egress linecard is different from the ingress linecard, the packet may be forwarded to the egress linecard via switch fabric 110. In some instances, the packet may have to be forwarded to a management card in order to determine how the packet is to be forwarded.

Since a multicast packet can have multiple destinations, a received multicast packet may have to be replicated and the replicates then forwarded to one or multiple output ports to facilitate forwarding of the packets to their intended multiple recipients. For a multicast packet received on an input port coupled to an ingress linecard, the output ports for the packet may include ports on the same ingress linecard itself, and/or ports on other linecards. Depending upon the location of the output ports determined for a received multicast packet, replication of the multicast packet may occur at various locations within router 108. For example, in the case where the packet is to be forwarded from an ingress card to two different egress linecards, the replication may performed by switch fabric 110 with one replicate being sent to the first egress linecard and the second replicate being sent to the second egress linecard. In the case where the packet is to be forwarded to different ports of the ingress linecard, the replication may be performed by the ingress linecard itself. In the case of VLANs, a multicast packet may need to be replicated and forwarded to different VLANs on the same output port. In this scenario, replication of the multicast packet may be performed by the output port itself.

Management cards 114A and 114B represent the control or management plane of router 108 and are configured to perform management and control functions including functions that facilitate multicast routing services provided by router 108. For example, management cards 114 may perform management functions related to linecards 112. These management functions may include maintaining and downloading routing information, including unicast and multicast routing information, to a linecard so that the linecard can use the information to perform data forwarding. The management functions may also include keeping the routing information up-to-date as changes occur in the network, responding to network events and messages, and the like.

In the embodiment depicted in FIG. 1, router 108 comprises two management cards 114A and 114B, each comprising a CPU 118 referred to as management processor (MP). Each MP can execute software instructions, code, or programs for controlling the operations of router 108, including operations related to providing multicast routing services. In one embodiment, an MP 118 may be a general purpose microprocessor such as a PowerPC, Intel, AMD, or ARM microprocessor, operating under the control of software stored in an associated memory. The memory may store various programs/code/instructions and data constructs, which when executed by an MP, cause execution of functions that are responsible for facilitating unicast and multicast routing services provided by router 108. As previously indicated, each management card is communicatively coupled to other management cards and linecards 112 via switch fabric 110.

Multiple management cards 114A and 114B comprising MPs 118A and 118B provide for redundancy. During normal operation of router 108, one of the two MPs 118A and 118B operates in active mode while the other MP operates in standby mode. The MP operating in active mode is referred to as the active MP and is responsible for performing the control and forwarding functions, including functions for providing multicast services, for router 108. The other MP operates in standby mode and is referred to as the standby MP and does not perform the functions performed by the active MP. The management card comprising the active MP is referred to as the active management card and the management card comprising the standby MP is referred to as the standby management card. In the embodiment depicted in FIG. 1, MP 118A is the active MP, which makes management card 114A the active management card. MP 118B is the standby MP, which makes management card 114B the standby management card. A switchover may however cause MP 118B to become the active MP and MP 118A to become the standby MP.

During normal operations, the active MP of router 108 is configured to manage the hardware resources of router 100 and perform a set of functions. During this time, the standby MP is passive and does not perform the set of functions performed by the active MP. When a switchover occurs, the standby MP becomes the active MP and takes over management of hardware resources of router 108 and performance of the set of functions related to router 108 that were previously performed by the MP that was previously active and, as a result, the set of functions continue to be performed. The previous active partition may then become the standby partition and be ready for a subsequent switchover. For example, for the embodiment depicted in FIG. 1, a switchover will cause standby MP 118B to become the new active MP and active MP 118A to become the standby MP. The set of functions that are performed by an active MP may differ from one network device to another.

Conceptually, when operating in active mode the active MP performs a set of functions that are not performed by the standby MP. This set of functions may include networking-related functions including multicast routing-related functions. When a switchover occurs, the standby MP becomes the active MP and takes over performance of the set of functions from the previous active MP. The active-standby model coupled with techniques described in this application enable the set of functions including multicast-related functions to be performed without any interruption even during or after a switchover. This translates to higher availability of router 108. This enables router 108 to provide for uninterrupted or hitless (also referred to as non-stop routing (NSR)) multicast routing capabilities. The previous active partition may then become the standby partition after a switchover.

A switchover may be caused by various different events, including anticipated or voluntary events and unanticipated or involuntary events. A voluntary or anticipated event is typically a voluntary user-initiated event that is intended to cause the active MP to voluntarily yield control to the standby MP. An instance of such an event is a command received from a network administrator to perform a switchover. There are various situations when a network administrator may cause a switchover to occur on purpose, such as when software on the MPs and linecard processors (LPs) is to be upgraded to a newer version. As another example, a switchover may be voluntarily initiated by the system administrator upon noticing performance degradation on the active MP or upon noticing that software executed by the active MP is malfunctioning. In these cases, the network administrator may voluntarily issue a command that causes a switchover, with the hope that problems associated with the current active MP will be remedied when the standby MP becomes the new active MP. A command to cause a switchover may also be initiated as part of scheduled maintenance. Various interfaces, including a command line interface (CLI), may be provided for initiating a voluntary switchover.

An involuntary or unanticipated switchover (also sometimes referred to as a failover) may occur due to some critical failure (e.g., a problem with the software executed by the active MP, failure in the operating system loaded by the active MP, hardware-related errors on the active MP or other router component, and the like) in the active MP.

In one embodiment, router 108 is able to perform a switchover without interrupting the multicast forwarding services offered by router 108. Router 108 is able to continue providing multicast forwarding services at line rates while performing a switchover without experiencing any multicast packets loss after or due to a switchover. Accordingly, router 108 is able to perform switchovers without impacting the forwarding of multicast packets during or as a result of the switchover. Such a switchover is thus characterized as "hitless" for multicast routing services since there is no hit on the multicast forwarding capabilities of the router. In this manner, router 108 provides multicast NSR.

The operation of multicast routing protocols results in the creation of various multicast forwarding states that are used for providing multicast services. Router 108 thus maintains multicast state information (multicast information) and uses it for providing multicast forwarding services. Multicast information may be stored by various components of router 108. For example, the active MP 118A maintains multicast information 120A on active management card 114A and uses it to perform multicast routing-related functions. Each linecard 112 may also maintain multicast information that is used by the linecard to perform multicast routing. The multicast information maintained by one component of router 108 may be the same as or different from the multicast information maintained by another component. For example, a linecard may only maintain a subset of the multicast information 120A maintained by the active MP. Various synchronization techniques may be used to synchronize multicast information 120A or portions thereof maintained by active MP 118A with multicast information stored by a linecard 112, as discussed below in more detail.

In one embodiment, the standby MP also maintains multicast information and the multicast information maintained by the standby MP is periodically synchronized with the multicast information maintained by the active MP. Various synchronization techniques are used to synchronize the multicast information maintained by the standby MP with multicast information maintained by the active MP.

The active MP thus stores multicast information, which is then synchronized in its entirety or portions thereof to the standby MP and the linecards. Various techniques are used to perform the synchronization. According to one technique, referred to as incremental updates, active MP 118A is configured to send updates 122 to the entity whose multicast information is being synchronized. For example, active MP 118A is configured to periodically send incremental updates 122 to standby MP 118B comprising portions of multicast information 120A maintained by the active MP. Multicast information 120B maintained by standby MP 118B is then updated based upon the updates received from the active MP. Active MP 118A may also use the incremental updates technique to send updates 128 to one or more linecards 112 comprising portions of multicast information 120A in order to synchronize the multicast information maintained by the linecards. According to another synchronization technique, referred to as bicasting, multicast control protocol packets received by router 108 are sent to both the active MP and the standby MP. This enables both the active MP and standby MP to build multicast information based upon the control protocol packets. Further details related to various synchronization techniques are provided below. In one embodiment, router 108 uses a combination of incremental updates and bicasting to synchronize multicast information between an active MP and a standby MP.

In one embodiment, synchronization is performed such that the standby MP (e.g., standby MP 118B in FIG. 1) has sufficient multicast state information that enables the standby MP to continue providing multicast forwarding services without disruption upon a switchover when the standby MP becomes the active MP. As a result of multicast information synchronized to the standby MP, when the standby MP becomes the new active MP upon a switchover, the new active MP already has sufficient multicast information that it can use to provide for hitless multicast routing services. In one embodiment, the new active MP may rebuild parts of its multicast information using the synchronized information and be able to provide uninterrupted multicast routing. As a result of the synchronization, when the standby MP becomes the new active MP upon a switchover, it does not have to build the requisite multicast information from scratch.

Further, unlike conventional techniques, the new active MP does not have to rely on information received from router 108's neighboring network devices to build its multicast routing state information. The dependency on the neighboring network device is thus removed leading to faster switchover times. Due to the removal of the dependency, in one embodiment, router 108 may not have to advertise the switchover to neighboring network devices. As a result, in one embodiment, router 108 may not change the GenID in PIM hello packets that it sends out to its neighbors. In fact, router 108's neighboring network devices may not even know that a switchover has occurred since there is no change in the GenID. This reduces the processing burden on neighboring network devices since they can continue to perform their processing in a normal manner and do not have to undertake any special processing to aid router 108 in building its multicast routing information. Since router 108 is not dependent upon its neighbors, the multicast routing services provided by router 108 are independent of whether or not the neighbors support GenID. The provision of multicast routing provided by router 108 is thus not affected by any problems that may occur in the neighbor routers or in receiving information from the neighbors.

Figure 2:
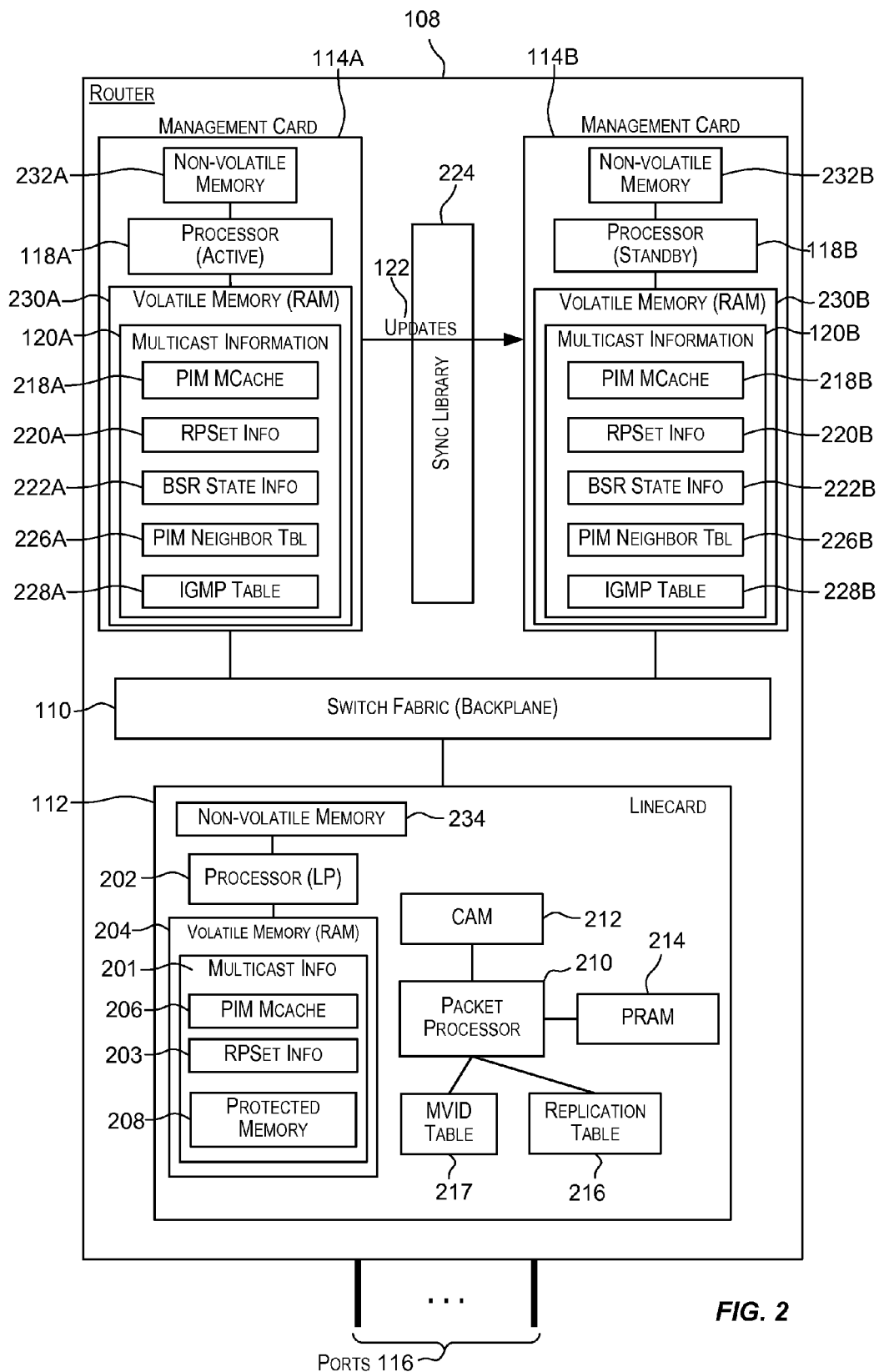
FIG. 2 depicts a simplified block diagram showing more details of the router depicted in FIG. 1.

FIG. 2 depicts a simplified block diagram showing more details of router 108 depicted in FIG. 1. As previously described, router 108 comprises two management cards 114A and 114B and one or more linecards 112 communicatively coupled to one another via switch fabric 110. The embodiment of router 108 depicted in FIG. 2 is not intended to limit the scope of the invention as recited in the claims. Alternative embodiments of router 108 may have more or fewer components that those depicted in FIG. 2.

As shown, linecard 112 comprises a processor (referred to as linecard processor or LP) 202 that is configured to execute software related to functions performed the linecard. LP 202 may be a PowerPC, Intel, AMD, or ARM microprocessor, operating under the control of software. LP 202 may have an associated non-volatile memory 234 and a volatile memory (e.g., RAM) 204. Non-volatile memory 234 may store programs/code/instructions and data constructs that are used for processing performed by LP 202. Non-volatile memory 234 may be of different types including a compact flash, a hard disk, an optical disk, and the like. In one embodiment, non-volatile memory 234 may store a software image (of a particular version) that is executed by LP 202.

LP 202 may maintain multicast information 201 in volatile memory 204. LP 202 may use multicast information 201 to perform multicast routing-related functions. In one embodiment, multicast information 201 may be downloaded to the linecard by the active MP and may represent a portion of the multicast information stored by the active MP. As the multicast information changes, the active MP may be configured to download the changes or updates to linecard 112. Multicast information 201 represents the software multicast information.

As shown in FIG. 2, linecard 112 also comprises one or more packet processors 210 that are programmed to perform processing related to forwarding of packets from an input port to an output port. Since processing performed by a packet processor 210 needs to be performed at a high packet rate in a deterministic manner, packet processor 210 is generally a dedicated hardware device configured to perform the processing. In one embodiment, packet processor 210 is a programmable logic device such as a field programmable gate array (FPGA) or an application-specific integrated circuit (ASIC). Forwarding performed by packet processor 210 is sometimes referred to as hardware-based forwarding.

Packet processor 210 may have associated memories to facilitate packet forwarding. In one embodiment, as depicted in FIG. 2, each packet processor 210 has an associated content addressable memory (CAM) 212 for performing lookups, a RAM 214 for storing forwarding parameters (RAM 214 is referred to as a parameter RAM or PRAM). In one embodiment, for a packet received via an input port of linecard 112, packet processor 210 is configured to extract information from the packet and perform a lookup in its associated CAM 212 using the extracted information. The extracted information may include, for example, the header of the received packet (including the multicast group address) or other contents of the packet. A matching CAM entry provides a pointer to a location in the associated PRAM 214, which stores parameters information identifying how the packet is to be forwarded within router 108. The forwarding information provided by the PRAM identifies one or more output ports of the router to which the packet is to be forwarded. Packet processor 210 then facilitates forwarding of the packet from the input port to the determined one or more output ports. If no matching CAM entry is found, then the packet may be forwarded to a management card for learning and subsequent forwarding.

In one embodiment, packet processor 210 is configured to form a forwarding bitmask (referred to as a forwarding identifier) using the information from the PRAM, where the bits of the bit mask indicate the one or more output ports of the router to which the packet is to be forwarded. A forwarding identifier thus identifies a set of one or more output ports of the router to which the packet is to be forwarded. The forwarding bitmask may be associated with the packet and then used by various components of router 108 to facilitate forwarding of the packet within router 108 from an input port to one or more output ports. In one embodiment, the forwarding bitmask is associated with the packet by appending information to the packet comprising the forwarding bitmask. The appended information is removed from the packet prior to the packet being forwarded from router 108 using an output port. In one embodiment, a forwarding identifier is used to index into a forwarding identifier table and the indexed entry shows which ports are the output interfaces for the packet. In this manner, the forwarding identifier is used to route a packet (or copies of the packet for multicast forwarding) from an input port to an output port of router 108.

The forwarding identifier thus is used to determine an output port (also referred to as an outgoing interface or OIF) to be used for forwarding a packet from router 108. For a multicast packet, there may be multiple output ports (or OIFs) on the same or different linecards. For example, for a particular forwarding identifier, the lookup in the CAM and PRAM may yield forwarding information such as: for a multicast packet received on input interface 1/1 (linecard 1 port 1), the packet is to be output using output interfaces 2/1 (linecard 2 port 1) and 3/1 (linecard 3 port 1). In this example, the output ports are on different linecards. In this case the packet may be replicated by switch fabric 110 and one replicate forwarded to linecard 2, port 1 and the other forwarded to linecard 3, port 1.

For a particular output port, there may be multiple VLANs mapped to that output port. A multicast packet may need to be forwarded to multiple VLANs associated with the output port. Router 108 stores information that it uses to determine how a multicast packet is to be replicated with respect to multiple VLANs for a port. This information is stored in the form of MVID table 217 and replication table 216. The router thus uses forwarding identifier information, MVID table 217, and replication table 216 for performing egress forwarding of multicast packets.

In one embodiment, MVID table 217 and replication table 216 are stored on a per port basis by a linecard. The MVID table for a port stores the multicast-VLAN-identifiers (MVIDs) for that port. For example, an MVID table for port 0 may store MVIDs MVID0, MVID1, etc. Likewise, an MVID table for port 1 may store MVIDs associated with port 1. In an alternative embodiment, all the MVIDs for ports on a linecard may be stored in a single MVID table. In one embodiment, each MVID entry in an MVID table stores a pointer to an entry in replication table 216. Replication table 216 stores information that is used to determine how the multicast packet is to be replicated and forwarded. In one embodiment, replication table 216 stores L2 specific multicast information.

Accordingly, for egress routing of a multicast packet, the forwarding identifier appended to the packet may be used to determine the output ports to be used for forwarding the packet. The multicast packet is then replicated and sent to the output ports, which may be on the same or different linecards of router 108. An output port may be local or remote to the linecard on which the multicast packet is received (i.e., the input port) by router 108. Further, for a port, the MVID table and replication table for the port is used to determine the one or more VLANs on the port to which the packet is to be replicated and forwarded. The multicast packet may then be replicated at an output port and forwarded to the one or more VLANs on the port. An MVID thus represents a port and VLAN combination. The MVID table and replication table implementation described above store the VLAN information in a port-centric manner, which allows for port-centric processing of VLANs.

For a multicast packet to be delivered, processing is performed to determine the ports of router 108 to which the packet is to be forwarded. A port may have multiple associated VLANs to which the multicast packet is to be forwarded. For a port, the MVID table associated with that port and its associated replication information may be used to determine the one or more VLANs to which a multicast packet is to be forwarded.

In one embodiment, the entries in CAM 212, PRAM 214, MVID table 217, and replication table 216 are programmed by LP 202 based upon information received from the active MP. The allocation and management of forwarding identifiers and the MVIDs is done by the active MP.

Router 108 comprises two management cards, each with an MP. During operation of router 108, one of the two MPs is configured to operate in active mode and is called the active MP. While one MP is operating in active mode, the other MP may operate in standby mode. In the embodiment depicted in FIG. 2, processor 118A is the active MP on active management card 114A and processor 118B is the standby MP on standby management card 114B. The active MP is responsible for maintaining multicast state information, which it uses for providing multicast routing services. In one embodiment, multicast information 120A comprises PIM mcache information 218A (also referred to as multicast routing table), RPSet information 220A, BSR state information 222A, PIM neighbor table 226A, and IGMP table 228A.

The multicast information stored by router 108 controls the path that multicast packets take through a network from a sender to a receiver. The routing information used for multicast may be generated by a multicast routing protocol such as PIM that is executed by the active MP of router 108. Multicast packets are forwarded in a network using a multicast distribution tree. A multicast packet is replicated at each fork in the distribution tree such that only one copy of the packet is received by each intended recipient of the packet. A multicast protocol such as PIM may be used to set up multicast distribution trees such that data packets from senders to a multicast group reach all receivers who have joined the group.

There are generally two types of multicast distribution trees: a source multicast distribution tree and a shared multicast distribution tree. A source multicast distribution tree is rooted at the sender (i.e., the source of a multicast packet) and the receivers are located at the ends of the branches of the tree. The branches of a source multicast distribution tree form a Shortest Path Tree through the network from the sender to the one or more receivers. A separate source multicast distribution tree is built for each sender host sending data to a multicast group. An (S,G) notation is used to represent forwarding entries based upon a source distribution tree, with each active source having an (S,G) entry, where S represents the IP address of the source and G represents the multicast group address to which the packet is to be sent.

Shared multicast distribution trees use a single common root placed at some chosen node in the network. In PIM, the common root is referred to as the Rendezvous Point or RP. The RP is the point at which receivers join to learn of active sources. Multicast sources transmit their traffic to the RP. When receivers join a multicast group on a shared tree, the root of the tree is always the RP, and multicast traffic is transmitted from the RP down toward the receivers. Therefore, the RP acts as a go-between for the sources and receivers. Multicast forwarding entries for a shared tree use the notation (*, G), with the * representing that all sources for a particular group share the same tree and G representing the multicast group address.

PIM mcache information 218A stores information related to multicast routes, which is used for forwarding multicast packets. In one embodiment, mcache information 218A comprises multiple forwarding entries (referred to as mcache entries) that are cached by router 108 and are used to determine how a multicast packet is to be forwarded by the router. The entries comprise (S,G) or (*,G) entries, with each entry identifying an incoming interface information (e.g., input port information) and associated one or more outgoing interfaces (e.g., output ports) information. The incoming interface information associated with a forwarding entry identifies an interface of the router over which a multicast packet is received. The outgoing interface information associated with a forwarding entry identifies, for a multicast packet received via the incoming interface identified by the entry, one or more interfaces of the router to be used for forwarding the multicast packet from the router. For example, a forwarding entry may be of the form:

(S,G),
   Incoming interface: 1/1
   Outgoing interface list: 2/1, 3/1

This entry implies that a multicast packet originating from a source host S and destined for multicast group G, and received over interface 1/1 of the router is to be forwarded from the router using interfaces 2/1 and 3/1 of the router. The multicast packet is replicated to interfaces 2/1 and 3/1.

The forwarding entries stored by mcache information 218A are used by the active MP to determine how a multicast packet received over an input port is to be replicated and forwarded to one or more outgoing interfaces. Multiple protocol events may cause the forwarding entries in mcache table 218A to be created, updated, or deleted. The active MP is responsible for maintaining mcache information 218A.

In one embodiment, RPSet information 220A comprises information related to the RP that is learned from PIM Boot-Strap Router (BSR). In one embodiment, this information comprises candidate-RP address, candidate-RP priority, multicast prefix range, and prefix length that the candidate-RP serves. There could be multiple RPs associated with a multicast domain.

BSR state information 222A comprises state information of the PIM BootStrap Router (BSR), including the Elected BootStrap Router (E-BSR) address, E-BSR hash mask length, E-BSR priority, and the BSR acceptance state.

PIM neighbor table 226A stores information related to routers in the network that are configured as PIM routers (i.e., routers that support the PIM protocol). This information is created and updated by the active MP based upon PIM control packets (e.g., PIM hello packets) received by router 108. The information in PIM neighbor table 226A is stored for each interface of the router. An entry in PIM neighbor table 226A specifies an interface and an address of a PIM router associated with the interface. Additionally, each entry may have an associated expiry or hold time associated with the PIM router and a DR (designated router) priority. Each neighbor is configured to indicate that it is alive by sending hello messages to router 108. When a neighbor stops sending such hello messages, there is a period of time (specified by the hold time in the entry) until which the neighbor is held onto and after which it is expired. The description of information stored by PIM neighbor table 226A is not meant to be exhaustive. The contents of PIM neighbor table are known to one of ordinary skill in the art and are defined by RFC 4601.

The IGMP protocol is used to identify members of a multicast group and allows IGMP-configured hosts to join or leave multicast groups and to advertise their membership in a multicast group. IGMP table 228A stores information related to the IGMP protocol. This table is built by the active MP based upon IGMP control packets (e.g., IGMP membership report packets) received by router 108. The standby MP maintains its own IGMP table 228B independently of the IGMP table maintained by the active MP. As described below, bicasting is used to enable the active MP and the standby MP to maintain their respective IGMP tables. Using bicasting, IGMP membership reports are bi-casted to both MPs, and they maintain the tables independently.

As described above, multicast information 120A maintained by active MP 118A may comprise various pieces of information including mcache information 218A, RPSet information 220A, BSR State information 222A, PIM neighbor table 226A, and IGMP table 228A. Router 108 uses various techniques to synchronize multicast information maintained by the standby MP and the linecards with the multicast information maintained by the active MP. With regards to the standby MP, multicast information is synchronized to the standby MP such that the standby MP has sufficient information to provide multicast routing services without interruption after the standby MP becomes the active MP upon a switchover and without having to wait to receive information from other neighboring routers. The various synchronization techniques that are used strive to reduce the amount of messaging between the active MP and standby MP while at the same time ensuring that the requisite information is provided to the standby MP and also to the linecards so as to enable multicast routing services to be provided without disruption.

In one embodiment, the following two synchronization techniques are used:
(1) Bicasting; and
(2) Incremental updates.
(1) Bicasting In this technique, a piece of information is sent to both the active MP and the standby MP. Each MP then, independently of the other MP, uses the received piece of information to update multicast information maintained by the MP. In one embodiment, using bicasting, certain control packets received by router 108 are sent to both the active MP and the standby MP. This sending of a control packet to both the MPs is referred to as bicasting. The active MP updates its multicast information based upon the control packet that it receives. The standby MP updates its multicast information based upon the control packet that it receives. Since both MPs receive the control packet, the same updates to the multicast information are made to the active MP and the standby MP and as a result the multicast information is synchronized. Accordingly, bicasting is a mechanism that delivers control packets to both active and standby MPs, so that they can populate the same information based upon the control packets.

The PIM neighbor table is created and updated based upon PIM control packets (e.g., PIM hello packets) received by router 108. A PIM control packet may be received on a port coupled to an ingress linecard. The linecard receiving a PIM control packet is configured to send a copy of the packet to the active MP and send another copy to the standby MP. In this manner, linecard 112 is configured to send the PIM control packet to both the active MP and the standby MP. This is referred to as bicasting of the PIM control packet. As a result of the bicasting, both the active MP and the standby MP receive a copy of the PIM control packet. Each MP can then independently update its PIM neighbor table based upon the received control packet. For example, active MP 118A can update its PIM neighbor table 226A based upon the control packet copy that it receives from linecard 112 and standby MP 118B can update its PIM neighbor table 226B based upon the control packet copy that it receives from linecard 112. In this manner, by making PIM control packets available to both the MPs, the PIM neighbor information maintained by the MPs can be independently updated and kept in a synchronized state. In one embodiment, only PIM hellos are delivered to both the active MP and the standby MP, all other PIM control messages are blocked from the standby MP.

The IGMP table is created and updated based upon IGMP control packets (e.g., IGMP membership report packets) received by router 108. An IGMP control packet may be received on a port coupled to an ingress linecard. The linecard receiving an IGMP control packet is configured to send a copy of the packet to the active MP and send another copy to the standby MP. In this manner, linecard 112 is configured to send the IGMP control packet to both the active MP and the standby MP. This is referred to as bicasting of the IGMP control packet. As a result of the bicasting, both the active MP and the standby MP receive a copy of the IGMP control packet. Each MP can then independently update its IGMP table based upon the received control packet. For example, active MP 118A can update its IGMP table 228A based upon the control packet copy that it receives from linecard 112 and standby MP 118B can update its IGMP table 228B based upon the control packet copy that it receives from linecard 112. In this manner, by making IGMP control packets available to both the MPs, the IGMP table information stored by the MPs can be independently updated and kept in a synchronized state.

In one embodiment, IGMP membership reports are received by both the active MP and the standby MP. The standby MP is configured to create IGMP states based upon the reports and update its IGMP table 228B.

In order to process IGMP control packets, both the active MP and the standby MP run an IGMP timer. This timer is used for executing the IGMP protocol on the active MP and standby MP and for keeping the IGMP table 228B maintained by the standby MP in synchrony with the IGMP table 228A maintained by the active MP.

In one embodiment, a PIM timer is blocked on the standby MP and thus the standby MP is prevented from PIM timer driven events.

(2) Incremental Updates

According to this technique, multicast information updates are periodically communicated from the active MP to the standby MP (or a linecard) such that the multicast information maintained by the standby MP (or the linecard) is synchronized with multicast information maintained by the active MP. In one embodiment, this technique is used to synchronize the PIM mcache information, the RPSet information, and the BSR State information, or portions thereof, between the active MP and the standby MP. This technique may also be used to synchronize the PIM mcache information and the RPSet information or portions thereof between the active MP and a linecard.

According to this technique, the active MP (e.g., active MP 118A in FIG. 2) is configured to cause updates 122 to be sent to the standby MP (e.g., standby MP 118B in FIG. 2). The updates may comprise portions of multicast information 120A such that multicast information 120B maintained by standby MP 118B on standby management card 114B is kept in-sync with multicast information 120A or a portion thereof maintained by active MP 118A on active management card 114A. Updates may be sent comprising PIM mcache information 218A, RPSet information 220A, and BSR state information 222A. The updates for one type of multicast information (e.g., PIM mcache information) may be sent independently of updates for another type of multicast information (e.g., RPSet Information).

Various different delivery/transportation techniques may be used to communicate updates from the active MP to the standby MP and from the active MP to a linecard. These may include software-implemented techniques, hardware-implemented techniques, or combinations thereof. The delivery mechanism used to communicate updates from the active MP to the standby MP may be the same as or different from the delivery mechanism used for communicating updates from the active MP to a linecard.

In one embodiment, a synchronization library (sync library) 224 is used to send updates from the active MP to the standby MP and also from the active MP to an LP 202 on a linecard. Sync library 224 may comprise software, which when executed by the active MP, provides a delivery mechanism for transferring information from an active MP to a standby MP and/or from an active MP to an LP on a linecard. In one embodiment, sync library 224 provides a framework for synchronizing data object instances between applications/processes in an efficient manner. For example, the sync library may be used to synchronize data between a process running on an active MP and a process running on a standby MP. The sync library is used to synchronize information between the active MP and the standby MP to facilitate features such as non-stop routing (NSR).

In one embodiment, synchronize library 224 provides APIs or functions that may be called for packing and unpacking data into synchronization buffers and to transmit data between an application executing on active MP 118A to an application executing on the standby MP or LP. The use of sync library 224 as described below is, however, not meant to be limiting. Other delivery mechanisms may be used to send multicast information updates from the active MP to the standby MP and/or to the linecard in alternative embodiments.

Since sending an update from an active MP to a standby MP (or to a linecard processor) involves computing resources of the active MP, it is beneficial, if possible, to reduce the number of such updates, to reduce the amount of data passed between the sender (e.g., the active MP) and the receiver (e.g., the standby MP), and to reduce/simplify the signaling between the active MP and the standby MP (or linecard) involved in performing such updates. In one embodiment, this is achieved by using an incremental updates technique. The incremental update technique provides an efficient, lightweight, and scalable mechanism for synchronizing information between an active MP and a standby MP and/or a linecard.

Figure 3:
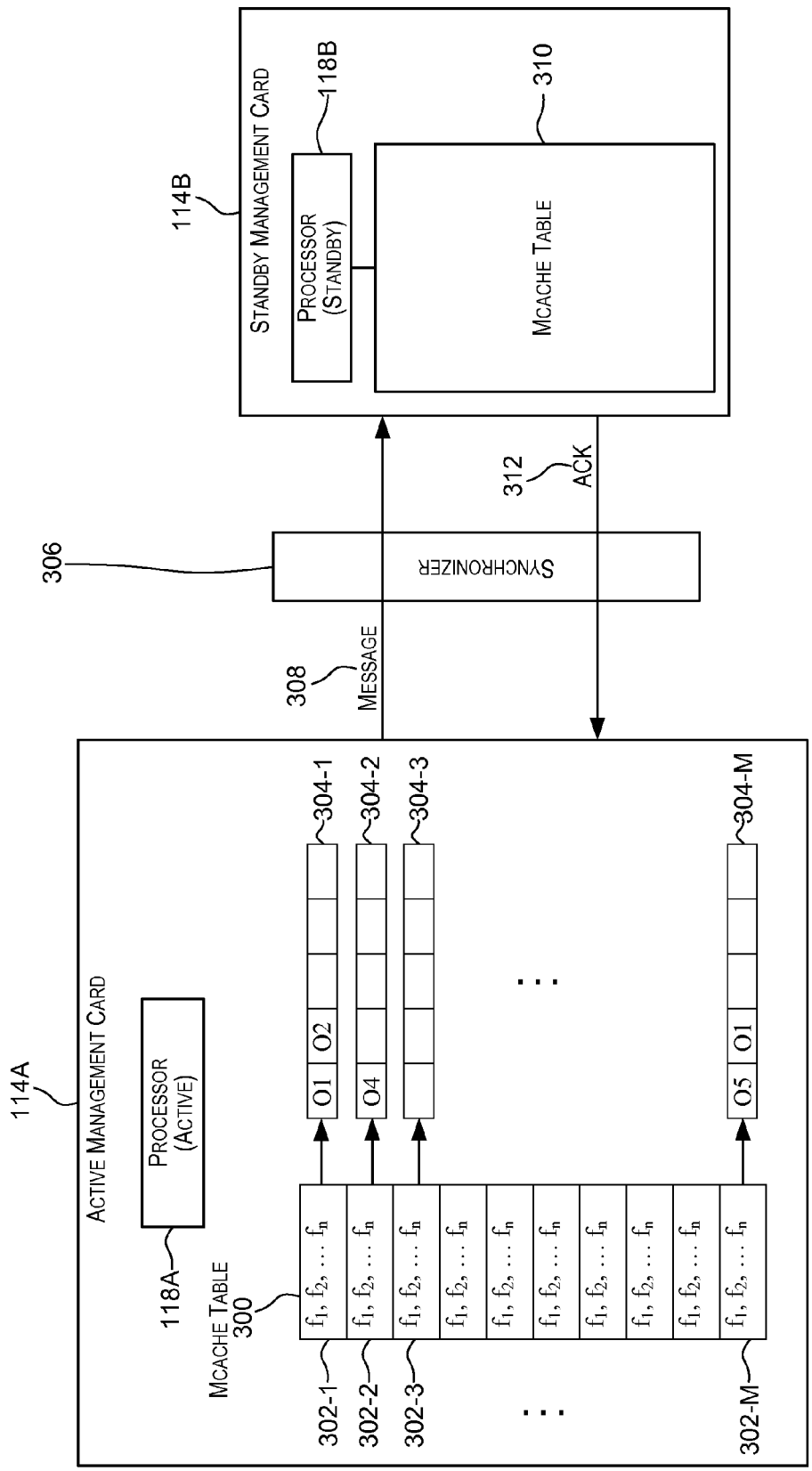
FIG. 3 depicts various components involved in synchronizing PIM mcache information maintained by a standby management processor with mcache information maintained by an active management processor using incremental updates according to an embodiment of the present invention.

The incremental updates technique may be described using PIM mcache information as an example. FIG. 3 depicts various components involved in synchronizing PIM mcache information maintained by a standby management processor with mcache information maintained by an active management processor using incremental updates according to an embodiment of the present invention. While FIG. 3 depicts synchronization of PIM mcache information, this is not meant to be limiting in any manner. The incremental updates technique may also be used to synchronize various other types of multicast information between a sender and a receiver, where the sender may be the active MP and the receiver may be a standby MP or a linecard LP. Further, various types of information including RPSet information and BSR state information may be synchronized using the incremental updates technique described below with respect to FIG. 3.

As shown in FIG. 3, active MP 118A may maintain PIM mcache information in volatile memory 230A in the form of an mcache table 300 comprising a set of mcache entries 302, with each mcache entry comprising a set of fields ($f_1$, $f_2, \ldots, fn$). In FIG. 3, each row of mcache table 300 represents an mcache entry (in FIG. 3, mcache table 302 comprises "M" mcache entries). Each mcache entry may comprise multiple fields including one or more fields for storing a group address, a source address, masks of one or more types, various types of flags, information related to ports, VLAN-related information (e.g., source VLAN ID), information related to neighbors of router 108 (e.g., RPF (reverse power forwarding) neighbor information), aging information, information related to incoming and outgoing interfaces (e.g., OIF information), and other information. The contents of an mcache entry are well known to one of ordinary skill in the art and are defined by RFC 4601.

Various events may cause the PIM mcache information maintained in mcache table 300 by active MP 118A to change. These events may include but are not limited to changes in the information received from one or more linecards 112, changes in network topology, multicast information received by the active MP (e.g., PIM-related information), changes made to the unicast routing table, and the like. A change made to mcache table 300 may involve adding/creating a new mcache entry in mcache table 300, deleting an existing mcache entry from mcache table 300, or modifying one or more fields of an existing entry in mcache table 300. As changes are made to PIM cache information in mcache table 300, active MP 118A causes these changes to be periodically propagated to standby MP 118B using incremental updates. The changes are communicated to the standby MP such that the PIM cache information maintained by the standby MP is kept in synchrony with PIM mcache information maintained in mcache table 300 by active MP 118A.

In one embodiment, all the fields of an mcache entry may be synchronized between an active MP and a standby MP or linecard. For example, in such an embodiment, an mcache entry 302-1 maintained by active MP 118A and a corresponding mcache entry maintained by standby MP 118B would have the same fields. In another embodiment, only a subset of the fields, and consequently only a subset of the PIM mcache information may be synchronized between the active MP and the standby MP (or LP). For example, while mcache entries maintained by active MP 118A may have "n" fields (as shown in FIG. 3), corresponding mcache entries maintained by standby MP 118B may not have all the "n" fields. The fields that are not synchronized are typically those fields whose information can be rebuilt using the information from fields that are synchronized.

Further, the mcache information that is synchronized between the active MP and the standby MP may be the same as or different from the mcache information that is synchronized between the active MP and a linecard LP. In one embodiment, the mcache information that is synchronized between the active MP and a linecard LP is a subset of the mcache information that is synchronized between the active MP and the standby MP.

In one embodiment, a set of opcodes is defined and used to propagate changes from mcache table 300 maintained by active MP 118A to the standby MP or to a linecard LP. An opcode identifies a portion of an mcache table entry that is to be changed or amended, where the portion could be the entire mcache entry or a portion thereof. An opcode may also identify the type of change to be made to the mcache information maintained by the standby MP. The type of change could be to insert a new mcache entry in the mcache table maintained by the standby MP, delete an mcache entry, change a specific set of fields of an mcache entry, and the like. Multiple opcodes may be defined for identifying different subsets of fields of an mcache entry to be changed.

In general, for purposes of this application, an opcode represents any information that identifies a change that is to be made to information maintained by a processor operating in standby mode, a line processor on a linecard, etc. An opcode thus indicates a change to be made to the information that is to be synchronized with information stored by the active MP.

Examples of opcodes that may be defined for a network device in one embodiment include but are not restricted to:
MCAST_INIT: Used to update/initialize all the fields of an mcache entry. Also used for inserting a new mcache entry in the mcache table.
MCAST_DEL_ENTRY: Used to delete an mcache entry.
MCAST_ASSERT: Used to update fields of an mcache entry related to assert information.
MCAST_FLAG_CHANGE: Used to update the flag field(s) of an mcache entry.
Other opcodes may be defined for alternative embodiments.

As previously indicated, the information that is synchronized from the active MP to the standby MP may be different from the information that is synchronized from the active MP to a linecard. Accordingly, while some opcodes may be used for both active MP-to-standby MP and active MP-to-linecard LP synchronization, other opcodes may be specific to active MP-to-standby MP or active MP-to-linecard LP synchronization.

In one embodiment, to facilitate incremental updates, a data structure (e.g., an array, a list) is maintained for each mcache entry. For example, in FIG. 3, an array 304-1 is maintained for mcache entry 302-1, array 304-2 is maintained for mcache entry 302-2, array 304-3 is maintained for mcache entry 302-3, and so on. In one embodiment, each array may be of a fixed size (e.g., having a maximum of 5 arrays slots as depicted in FIG. 3). In alternative embodiments, other data structures such as a linked list, which can grow dynamically, may also be used. Accordingly, while an embodiment has been described using an array implementation, this is not meant to be limiting.

In one embodiment, the data structures may be an extension of the mcache entries themselves. For example, the arrays structures 304 depicted in FIG. 3 may be extensions of mcache table 300. For example, array 304-1 may be implemented as part of mcache entry 302-1, and so on. In an alternative embodiment, the data structures may be maintained as separate data structures from mcache table 300 in volatile memory 230A by the active MP and are associated with corresponding mcache entries in mcache table 300.

An array 304 associated with an mcache entry 302 is configured to store opcodes corresponding to changes that have been made to the corresponding mcache entry in table 300 and which are to be propagated to a corresponding mcache entry in mcache table 310 maintained by standby MP 118B. Each opcode in an array associated with an mcache entry thus represents a change that has to be made to a corresponding mcache entry maintained by the active MP to synchronize it with the mcache entry maintained by the active MP.

An array associated with an mcache entry may comprise zero or more opcodes. For example, in FIG. 3, array 304-3 associated with mcache entry 302-3 does not comprise any opcodes. This implies that there are no updates to be sent to the standby MP for mcache entry 304-3. Array 304-1 associated with mcache entry 302-1 comprises two opcodes O1 and O2. This implies that updates corresponding to the two opcodes need to be propagated to the standby MP for mcache entry 302-1. Since the arrays store opcodes, they are sometimes referred to as opcode arrays.

In one embodiment, an opcode is written to an array associated with an mcache entry after a change has been made to that mcache entry. The change could be insertion of a new mcache entry, deletion of the mcache entry, or changing one or more fields of the mcache entry. For example, when a new mcache entry is added to mcache table 300, an opcode indicating a new entry (e.g., MCAST_INIT) may be added to the array associated with the newly added mcache entry. In one embodiment, each array is filled starting from the head of the array (i.e., the first available empty position in the array). In this manner, the positioning of opcodes within an array gives a timeline of when the changes were made to the corresponding mcache entry. As another example, when all the fields of an mcache entry are to be reset or initialized, then again an MCAST_INIT opcode may be written to the array associated with the mcache entry. As another example, for an mcache entry in mcache table 300 that is deleted and which is to be deleted from mcache table 310 maintained by the active MP, the mcache entry in mcache table 300 may be deleted but the array corresponding to the entry is still preserved and an opcode indicating a delete entry (e.g., MCAST_DEL_ENTRY) added to the array. This mcache entry and associated array may be preserved until the information is synchronized to the standby MP (or linecard). Likewise, when one or more fields of an mcache entry have been changed, an opcode corresponding to the changes (or comprising a superset of the changes) may be added to the array associated with the mcache entry.

Figure 4:
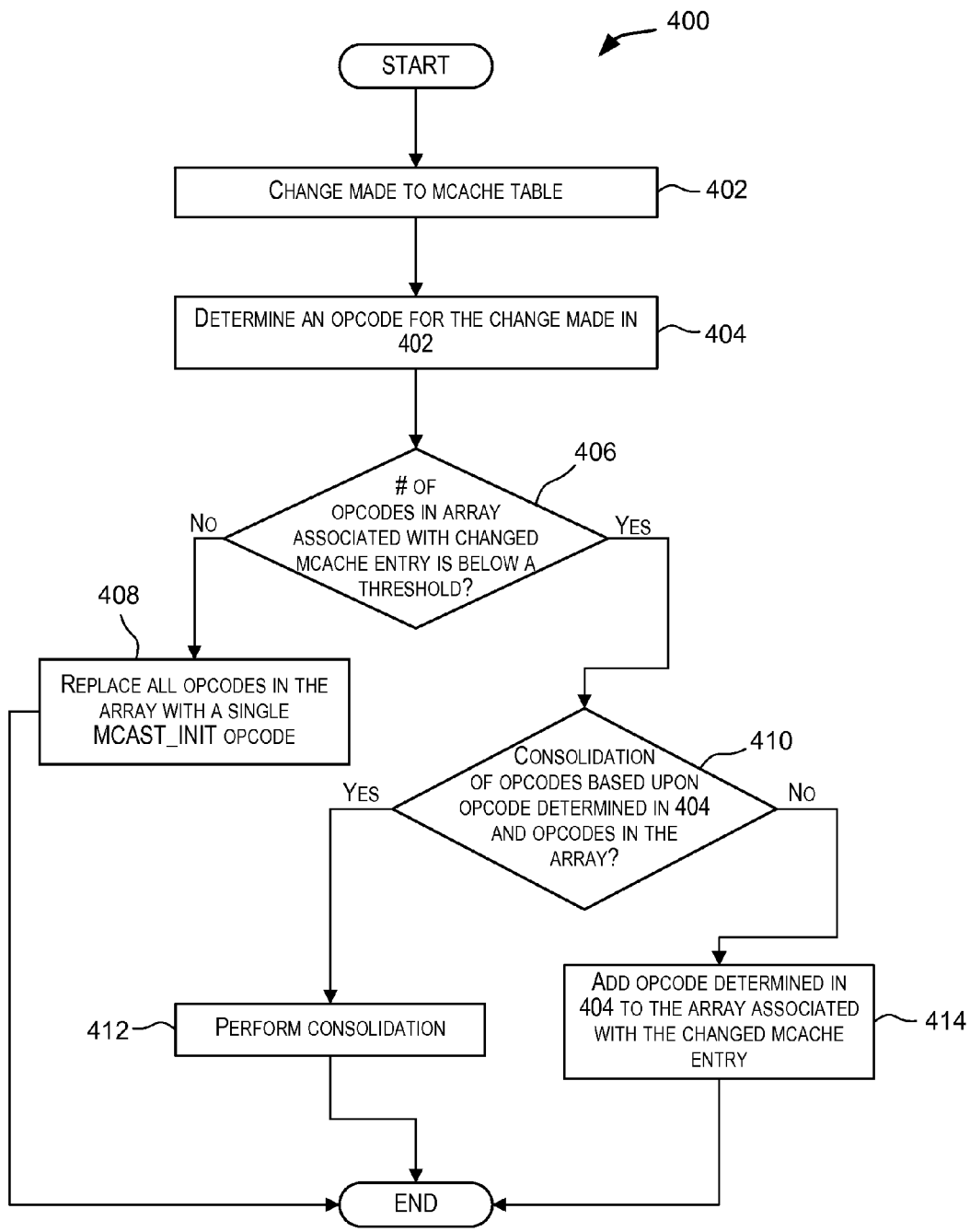
FIG. 4 depicts a simplified flowchart depicting processing performed by the active management processor upon making a change to the PIM mcache information according to an embodiment of the present invention.

FIG. 4 depicts a simplified flowchart 400 depicting processing performed by the active MP upon making a change to the PIM mcache information according to an embodiment of the present invention. The processing depicted in FIG. 4 may be performed using software (e.g., code, instructions, program) executed by the active MP. The software may be stored on a non-transitory computer-readable storage medium. The particular series of processing steps depicted in FIG. 4 is not intended to limit the scope of embodiments of the present invention.

As shown in FIG. 4, processing may be initiated when a change is made to mcache table 300 maintained by the active MP (step 402). As previously described, the change could be the addition of a new mcache entry to the mcache table, deletion of an exiting mcache entry from the mcache table, or changing one or more fields of an existing mcache entry. An opcode is determined for the change made in 402 (step 404). The opcode determined in 404 reflects the change to be made to the corresponding mcache entry maintained by the standby MP to synchronize it with the mcache entry maintained by the active MP. For example, the opcode may indicate that a subset of the fields of the mcache entry are to be changed, all the fields in the mcache entry are to be updated (e.g., opcode MCAST_INIT to reflect a complete mcache entry update), the mcache entry is to be deleted (e.g., opcode MCAST_DEL), a new mcache entry is to be added to mcache table maintained by the standby MP, and the like.

A check is made to see if the number of opcodes in the opcode array corresponding to the changed mcache entry is below a threshold (step 406). The opcode array for the mcache entry maintained by the active MP may have zero or more entries. In one embodiment, the threshold used in 406 corresponds to the maximum size of the opcode array. In such an embodiment, the check performed in 406 amounts to checking whether the opcode array associated with the changed mcache entry is full. For example, for the embodiment depicted in FIG. 3 where the maximum size of the array is five entries, the threshold may be set to five. In alternative embodiments, the threshold be may set to other values. The threshold may be user-configurable. In implementations where the data structure associated with an mcache entry can grow dynamically, such as a linked list, then an appropriate threshold may be set.

If it is determined in 406 that the number of opcodes in the opcode array is not below the threshold, then all the opcodes in the opcode array are removed and replaced by a single opcode indicating an update or reset of the entire mcache entry (step 408) and processing ends. For example, the opcodes in the opcode array may be replaced by a single MCAST_INIT opcode entry. The reasoning here is that if the number of updates to be synchronized to the standby MP for the mcache entry is above a certain number, represented by the threshold, then it is more cost effective to do a complete re-initialization of the mcache entry on the standby MP rather than performing individual updates.

If it is determined in 406 that the number of opcodes in the opcode array is below the threshold, then it is determined whether a consolidation of multiple opcodes can be performed based upon the opcode determined in 404 and the zero or more opcodes in the opcode array of the changed mcache entry (step 410). If possible, consolidation is then performed (step 412).

In one embodiment, consolidation seeks to reduce the number of opcodes associated with an mcache entry, where the opcodes associated with the entry include the opcode determined in 404 and the opcodes, if any, already in the array corresponding to the mcache entry. As a result of consolidation, instead of at least two opcodes associated with the mcache entry, only one opcode is associated with the mcache entry thereby reducing the total number of opcodes associated with the mcache entry.

Example 1

Before consolidation: OP1, OP2 are associated with an mcache entry.
After consolidation: OP3 is associated with the mcache entry instead of OP1 and OP2 and written to the array associated with the mcache entry.

Example 2

Before consolidation: OP1, OP2 are associated with an mcache entry.
After consolidation: OP1 is associated with the mcache entry and not OP2. OP1 is written to the array associated with the mcache entry (if not already in t he array).
In the above examples, OP1 and OP2 may include the opcode determined in 404 or may include opcodes already in the array corresponding to the mcache entry.

Consolidation may involve replacing multiple opcodes associated with an mcache entry with a single opcode, thereby reducing the total number of opcodes associated with mcache entry. In one embodiment, a first set of multiple opcodes may be replaced by a second set of multiple opcodes, where the number of opcodes in the second set of opcodes is less then the number of opcodes in the first set of opcodes.

Example 3

Before consolidation: OP1, OP2, OP3 are associated with an mcache entry.

After consolidation: OP4 and OP5 are associated with the mcache entry instead of OP1, OP2, and OP3. OP4 and OP5 are written to the array associated with the mcache entry and OP1, OP2, and OP3, if in the array, are removed.

In one embodiment, the consolidation processing is guided by a set of consolidation rules that may be configured for the router. A consolidation rule may identify the condition(s) under which a consolidation of opcodes may be performed and the manner in which the consolidation is to be performed. Processing performed in 410 and 412 may comprise determining one or more consolidation rules that are applicable based upon the opcodes associated with an mcache entry. The applicable rules may be determined based upon the opcode determined in 404 and based upon zero or more opcodes that already exist in the array associated with the mcache entry. Consolidation may then be performed as specified by the applicable consolidation rules. In one embodiment, the threshold related processing performed in 406 and 408 may also be configured as a consolidation rule, in which case the processing in 406 and 408 may also be performed as part of 410 and 412.

Examples of Consolidation Rules Include:

(1) If the total number of opcodes, including the opcode determined in 404 and opcodes in the opcode array for the mcache entry, equals or exceeds some threshold (which may be configurable), then all the existing opcodes are to be replaced with a single opcode indicating that the entire mcache entry (i.e., all the fields) is to be synchronized to the standby MP (or linecard).

(2) If the opcode determined in 404 indicates a full initialization of the mcache entry (e.g., the opcode is MCAST_INIT), then all the existing opcodes in the opcode array are to be replaced with the single opcode determined in 404. In one embodiment, if the opcode array comprises a MCAST_DEL_ENTRY opcode, then the MCAST_INIT is given higher priority and all the opcodes in the array are replaced with the MCAST_INIT determined in 404.

(3) If the opcode determined in 404 indicates a deletion of the mcache entry, (e.g., the opcode is MCAST_DEL_ENTRY), then all the existing opcodes in the opcode array are to be replaced with the single opcode determined in 404.

(4) If the opcode array comprises an opcode indicating a full initialization of the mcache entry (e.g., MCAST_INIT), then the opcode determined in 404 is to be ignored and not added to the opcode array; unless the opcode determined in 404 is an opcode that indicates deletion of the mcache entry, in which case rule (3) is followed.

(5) If the opcode array comprises an opcode indicating a deletion of the mcache entry (e.g., MCAST_DEL_ENTRY), then the opcode determined in 404 is to be ignored and not added to the opcode array.

(6) If the opcode determined in 404 already exists in the opcode array then the opcode determined in 404 is to be ignored and not added to the opcode array.

(7) If the opcode determined in 404 indicates a change in a first set of fields of the mcache entry, and the first set of fields is a superset of (or includes) fields indicated by one or more opcodes in the opcode array, then those one or more opcodes in the array are to be replaced by the opcode determined in 404. As an example, if the opcode determined in 404 indicates changes to be made to fields #2 and #3 of the mcache entry, and the opcode array comprises a first opcode that indicates a change to field #2 and a second opcode that indicates a change to field #3, then the first and second opcodes are replaced by the opcode determined in 404.

(8) If the opcode determined in 404 indicates a change to be made to a first set of fields of the mcache entry, and the opcodes in the array already encompass the first set of fields, then the opcode determined in 404 is to be ignored and not written to the opcode array. For example, if the opcode determined in 404 indicates a change to field #2, and the opcode array already comprises an opcode that indicates a change to be made to field #2 and possibly other fields, then the opcode determined in 404 is ignored and not added to the opcode array.

(9) If the changes indicated by the opcode determined in 404 and one or more opcodes in the opcode array can be consolidated and represented by a single opcode, then the single opcode is added to the opcode carry in place of the one or more opcodes. For example, if the opcode determined in 404 indicates a change to be made to field #1 of the mcache entry and the opcode array for the mcache entry comprises a first opcode indicating a change to be made to field #2 and a second opcode indicating a change to be made to field #3, and if there exists a single opcode that encompasses changes to be made to fields #1, #2, and #3, then that single opcode is written to the opcode array to replace the first and second opcodes the opcode determined in 404 is ignored and not written to the array.

As described above, various different consolidation rules may be configured for the router. In one embodiment, the consolidation rules may be ordered (or prioritized) and executed according to the ordering. The goal of the consolidation rules is to optimize the synchronization updates that are communicated from the active MP to the standby MP. In one embodiment, the consolidation rules seek to, wherever possible, reduce the number of opcodes in an opcode array associated with an mcache entry, which translates to a reduced number of updates being sent to the standby MP (or linecard) while at the same time optimizing (i.e., minimize) the amount of data that is communicated from the active MP to the standby MP (or linecard).

Referring back to FIG. 4, if it is determined in 410 that no consolidation can be performed, then the opcode entry determined in 404 is added to the opcode array (step 414) and processing ends. In one embodiment, after 414, another check may be performed as to the total number of opcodes in the opcode array. If the number equals or exceeds some threshold (which may be configurable), then all the existing opcodes in the opcode array may be replaced by a single opcode indicating that the entire mcache entry (i.e., all the fields) is to be updated. For example, all existing entries in the update queue may be removed and replaced by a single update event whose opcode is set to MCAST_INIT.

Referring back to FIG. 3, a synchronizer component 306 is responsible for propagating the changes from the active MP to the standby MP. As described above, in one embodiment, a sync library may be used for performing synchronization of information between the active MP and the standby MP. Synchronizer component 306 may be an application, process, or thread executed by the active MP and which may be initiated using an API provided by the sync library. Synchronizer component 306 uses the opcode arrays associated with mcache table 300 to determine which mcache entries are to be synchronized to the standby MP and the information in the entries that is to be synchronized. Updates are sent to the standby MP so as to synchronize the PIM cache information maintained by the standby MP with the PIM cache information maintained by the active MP (e.g., to synchronize the information in mcache table 310 with the information in mcache table 300).

Synchronizer 306 operates asynchronously from the process(es) responsible for the processing depicted in FIG. 4. Accordingly, between the time that an mcache entry is modified to the time that it is synchronized to the standby MP, there may be multiple changes that may have been made to mcache table 300.

Figure 5:
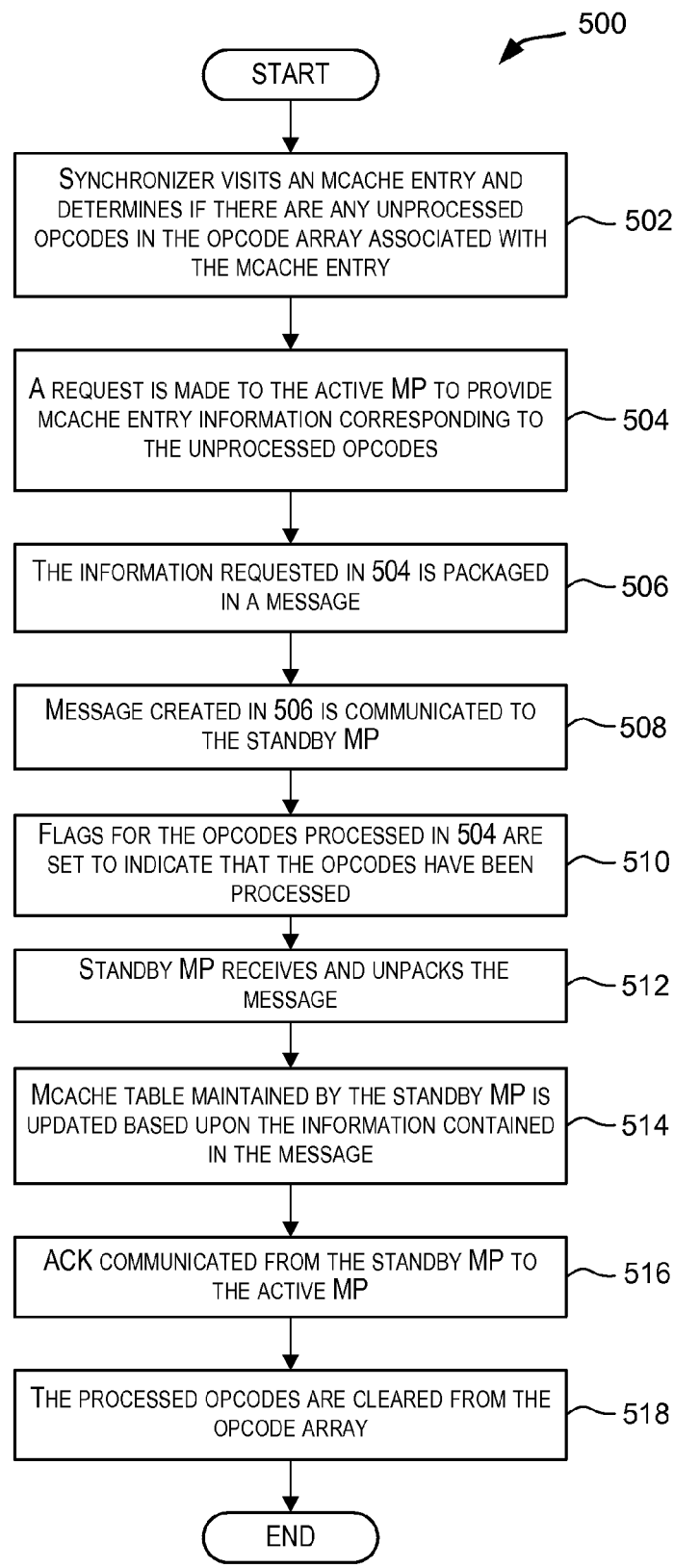
FIG. 5 depicts a simplified flowchart depicting processing performed for synchronizing mcache information from the active management processor to the standby management processor according to an embodiment of the present invention.

FIG. 5 depicts a simplified flowchart 500 depicting processing performed for synchronizing mcache information from the active MP to the standby MP according to an embodiment of the present invention. The processing depicted in FIG. 5 may be performed using software (e.g., code, instructions, program) executed by the active MP. The software may be stored on a non-transitory computer-readable storage medium. The particular series of processing steps depicted in FIG. 5 is not intended to limit the scope of embodiments of the present invention. The processing performed in FIG. 5 and described below is performed on a per mcache entry basis.

In one embodiment, synchronizer 306 is configured to, in a round-robin manner, visit each mcache entry and see if there are any opcodes in the opcode array associated with that mcache entry that have not yet been processed (step 502). In one embodiment, a flag may be associated with each opcode in the array to indicate whether or not that opcode has been processed. If there are one or more unprocessed opcodes, then for each unprocessed opcode in the array, a request is made to the active MP to provide mcache entry information corresponding to the unprocessed opcode (step 504). For example, if the array comprises a single MCAST_INIT opcode, then the information for the entire mcache entry may be requested. As another example, if the array comprises a first opcode corresponding to a first subset of fields of the mcache entry and a second opcode corresponding to a second subset of fields of the mcache entry, then in 504, information is requested for the first subset of fields and the second subset of fields. In one embodiment, if there is an overlap between the first subset of fields and the second subset of fields, then information may be requested for a union of the first subset of fields and the second subset of fields. The union may be less than all the fields of the mcache entry.

The information requested in 504 is provided by the active MP and packaged in a message 308 (step 506) that is then communicated to the standby MP (step 508). In one embodiment, if the array comprises multiple opcodes, then information requested for the multiple opcodes is packaged in a single message in 506 and then the single message communicated to the standby MP. This increases the efficiency of the information delivery since the multiple updates corresponding to the multiple opcodes can be packaged into a single message and delivered to the standby MP in a single shot. The flag associated with each opcode for which information is requested in 504 is set to indicate that the opcode has been processed (step 510).

In one embodiment, each mcache entry is uniquely identified using source information and group information stored by the entry. Accordingly, the information packaged in 506 includes at least these pieces of information. Depending upon the opcode, the information packaged in 506 may also include information related to other fields from the mcache entry. If the opcode indicates deletion of an mcache entry (e.g., an MCAST_DEL_ENTRY opcode), then the information packaged in 506 may include only source information and group information to identify the mcache entry to be deleted. If the opcode indicates a subset of fields of an mcache entry to be updated, then information related to only those fields (in addition to the source information and group information) may be packaged in 506. Accordingly, in one embodiment, the information packaged in 506 comprises source information, group information and additionally information related to only those fields identified as being changed by the opcode, and not all the fields.

At the standby MP the message is received and unpacked (step 512), and the information contained in the message is written to the corresponding mcache entry in mcache table 310 (step 514). The processing in 514 comprises identifying the mcache entry to be updated and then updating the information in the entry. In one embodiment, the mcache entry to be updated is identified using the source information and group information. In the case of a new mcache entry to be added, the location within mcache table 310 where the new entry is to be inserted may be determined and then a new mcache entry created at that location.

In one embodiment, once the update has been successfully made to mcache table 310, an acknowledgment (ACK 312) is communicated from the standby MP to the active MP (step 516). Synchronizer 306 may facilitate delivery of ACK 312 from the standby MP to the active MP. Upon receiving the ACK, active MP 114A is configured to delete all the opcodes in the array associated with the mcache entry whose processing resulted in the ACK being received (step 518). In this manner, an opcode is cleared from the opcode array for an mcache entry only after receiving acknowledgment that the mcache information corresponding to the opcode has been properly synchronized to the standby MP.

In the embodiment depicted in FIG. 5 and described above, a single message is used to pack updates for one or more opcodes for an mcache entry and the single message is then communicated to the standby MP. In alternative embodiments, a message may be generated for each opcode and communicated to the standby MP.

In the embodiment described above, synchronizer 306 is configured to visit each mcache entry in mcache table 300 to determine whether an update is waiting to be propagated to the standby MP for that mcache entry. Accordingly, the processing depicted in FIG. 5 and described above may be performed for each mcache entry. In another embodiment, synchronizer 306 may maintain an events queue, which stores events indicating which mcache entries have pending changes to be propagated to the standby MP. Synchronizer 306 may then walk this events queue to determine which mcache entries need to be synchronized to the standby MP. Information may be written to the events queue by the active MP whenever an opcode is added to an empty array.

In one embodiment, a change made to mcache table 300 is synchronized to both the standby MP and a linecard processor (LP) on a linecard. In such an embodiment, two sets of arrays may be maintained for the mcache table entries, with one set of arrays being used for updating the standby MP and the other set of arrays being used for updating the LP.

Hitless Switchovers

As described above, when a switchover occurs, the standby MP becomes the active MP and takes over management of hardware resources of router 108 and performance of the set of functions related to router 108 that were previously performed by the MP that was previously active. The previous active MP may then become the standby MP and be ready for a subsequent switchover. In one embodiment, a switchover is performed without any interruption to the multicast routing services provided by the network device.

A switchover may be caused by various different events, including anticipated or voluntary events and unanticipated or involuntary events. For example, a network administrator may cause a switchover to occur on purpose, such as when software on the MPs and LPs is to be upgraded to a newer version. In one embodiment, this switchover is performed without affecting multicast services provided by the router and thus is commonly referred to as a hitless upgrade.

As previously described with regards to FIG. 2, each of the active MP and standby MP has an associated non-volatile memory. In one embodiment, this memory stores software that is used by the MP to boot up. For example, a compact flash (CF) device may be provided for each MP, where the CF stores software, including the operating system, which is to be loaded for the MP. For example, the active MP may have an associated CF storing software to be loaded by the active MP and the standby MP may have another CF device storing software to be loaded by the standby MP. Even though two separate non-volatile memories are shown in FIG. 2, in an alternative embodiment, a single non-volatile device may be provided that presents two separate volumes (through virtualization), one for use by the active MP and the other for use by the standby MP.

Typically, the version of software running on both the MPs and also the LPs of linecards is the same (but not required). However, newer versions of the software are frequently released for various reasons such as to add new features, to improve functionality, to solve bugs in existing versions, to improve router performance, and the like. When a new version is released, the router, including the active MP, standby MP, and the linecards, has to be upgraded to the newer version. In one embodiment, a voluntary switchover is used to perform the upgrade in a manner that does not interrupt the multicast routing services by the router.

Figure 6:
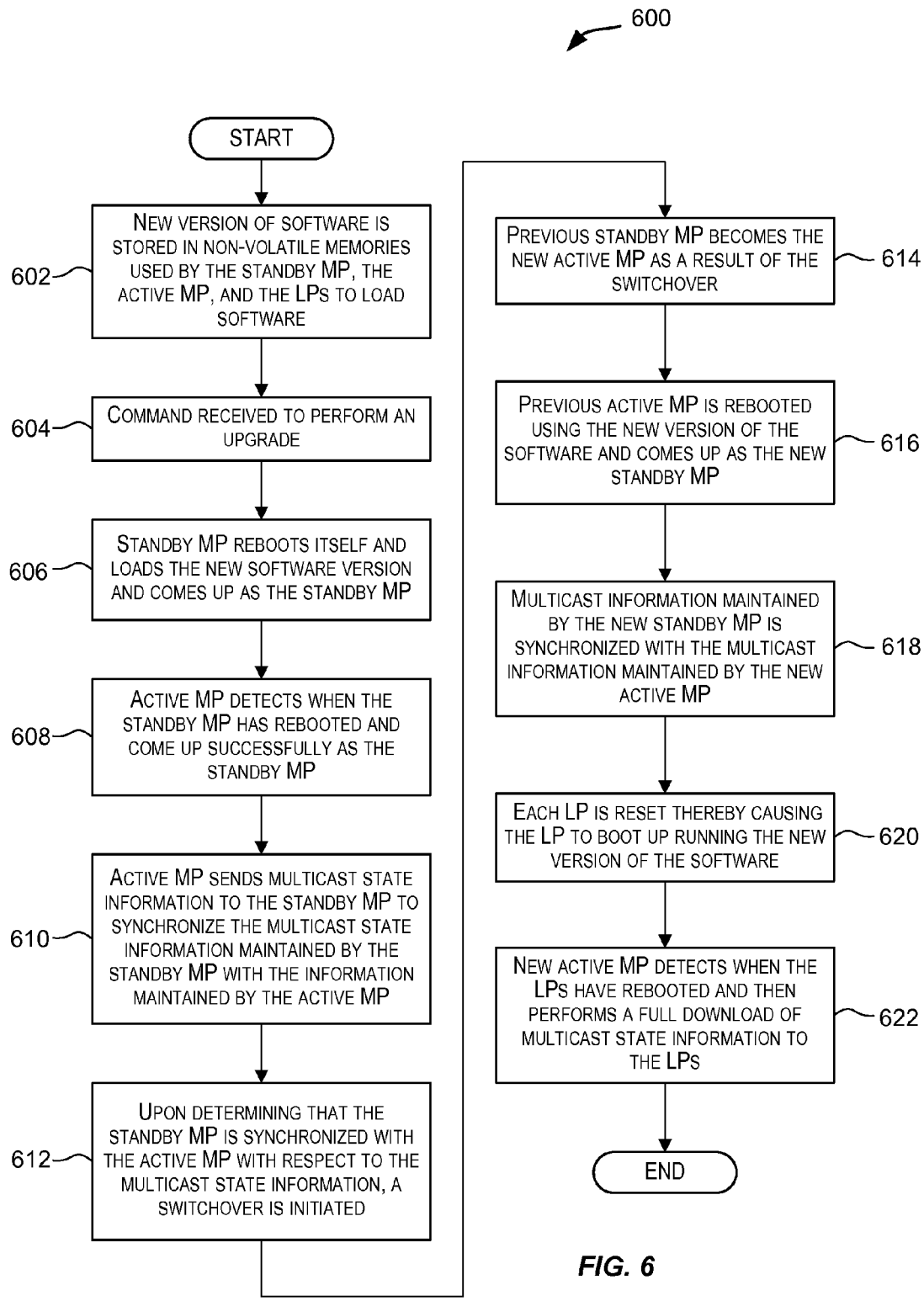
FIG. 6 depicts a simplified flowchart showing processing for performing a software upgrade using a switchover without interrupting multicast services provided by the router according to an embodiment of the present invention.

FIG. 6 depicts a simplified flowchart 600 showing processing for performing a software upgrade using a switchover without interrupting multicast services provided by the router according to an embodiment of the present invention. The processing depicted in FIG. 6 may be performed using software (e.g., code, instructions, program) executed by the standby MP and active MP, using hardware, or combinations thereof. The software may be stored on a non-transitory computer-readable storage medium. The particular series of processing steps depicted in FIG. 6 is not intended to limit the scope of embodiments of the present invention.

An image of the newer version of the software is stored in non-volatile memories used by the standby MP, the active MP, and the LPs to load software (step 602). For example, an image of the new version of the software may be written to a CF device used by the standby MP for boot purposes and to a CF device used by the active MP to boot up. The new software version may also be written to a non-volatile memory used by each LP for booting.

A command may then be received to perform an upgrade (step 604). A user may issue the command in 604 via various interfaces such as via a CLI and others. In response to the command in 604, the standby MP reboots itself using the new software version stored in its associated non-volatile memory and comes up again in standby mode as the standby MP (step 606).

The active MP detects when the standby MP has rebooted and come up successfully as the standby MP with the new version of the software (step 608).

When the standby MP comes up with the new software version loaded, it has lost the multicast information maintained by the standby MP prior to the bootup. For example, the PIM mcache table, the RPSet information table, the BSR state information table, the PIM neighbor table, and the IGMP table are all cleared. Upon detecting that the standby MP has rebooted and come up successfully as the standby MP with the new version of the software in 608, the active MP then sends multicast information to the standby MP to synchronize the standby MP's multicast state information with the multicast information maintained by the active MP (step 610). The information sent by the active MP to the standby MP in 610 may include the PIM mcache information, RPSet information, and the BSR state information. Meanwhile, after rebooting, the standby MP independently builds its PIM neighbor table and IGMP table using bicasting. As a result of bicasting, there is no need to send the PIM neighbor table information and the IGMP table information from the active MP to the standby MP in 610—the standby MP can build its own PIM neighbor state information and IGMP table information from the bicasted control packets.

Upon determining that the multicast information maintained by the standby MP is synchronized with the information maintained by the active MP, a switchover is initiated (step 612). A switchover is performed due to which the standby MP becomes the new active MP (step 614). In one embodiment, when the previous standby MP becomes the new active MP, it is put in a switchover-in-progress (SOIP) mode. In this mode, no timers are run (even though in active mode) to avoid any premature aging of information. There are two ways in which the new active MP can switch out of SOIP mode and enter normal active mode: (1) upon the expiry of a timer (e.g., a 90 s timer); or (b) after unicast routing has declared convergence.

The multicast routing state information depends (needs services) upon unicast routing information. For example, PIM uses contents of the unicast routing table. However, a unicast routing table is not available to the active MP immediately after a switchover and accordingly the new active MP needs to know when the unicast routing information has converged. If the unicast routing information cannot converge for some reason, then the timer forces the active MP out of the SOIP mode.

In one embodiment, in 614, the multicast state information that is available to the new active MP is traversed and used to build additional information used for providing multicast routing services. For example, the mcache entries in the mcache table are traversed and synchronized. The new active MP also claims ownership of hardware resources within the router that are used for multicasting, and which were previously managed by the previous active MP.

It is to be noted that in 614, the information that is used by the new active MP to build the active multicast routing state does not have to be built from scratch. This information or portions thereof were available to the MP when it was the standby MP at the time of the switchover. Additional multicast information that may be used by the new active MP for multicast routing is built using this available information. The building of the active multicast routing state for the new active MP does not have to depend upon information received from neighboring network devices or routers.

In one embodiment, the previous active MP is rebooted using the new version of the software and comes up as the new standby MP (step 616). As previously described, the new software version may be stored in a non-volatile memory associated with the previous active MP.

The multicast information maintained by the new standby MP is then synchronized with the multicast information maintained by the new active MP (step 618). Synchronization in 618 may be performed using incremental updates and bicasting, as previously described.

While the switchover processing described above is being performed, the linecard processors on the linecards are not aware of the switchover. The linecards continue to perform hardware-based forwarding as before the switchover. In one embodiment, each LP is then reset thereby causing the LP to boot up running the new version of the software (step 620).

For an LP, the new software version may be stored in a non-volatile memory used by the LP to perform a boot and then loaded by the LP after the reset.

The new active MP detects the one or more LPs after they have rebooted and come up with the new software version and then performs a full download of multicast state information to each rebooted LP (step 622). In one embodiment, in order to perform a full download to an LP, for PIM mcache information maintained by the active MP, an MCAST_INIT opcode is added to the array associated with each mcache entry. A synchronization mechanism is then used to update the mcache table entries maintained by the LP according to the processing depicted in FIG. 5 and described above. In one embodiment, the information may be downloaded to the LP after unicast route convergence. At this point in time, both the MPs and each LP are running the new version of the software.

In the manner described above with respect to FIG. 6, the standby MP, the active MP, and the LPs are all upgraded to a new version of the software without impacting multicast services provided by the router. Since the new active MP does not have to build the multicast state information from scratch, the switchover can be performed in a faster time without impacting routing services. Further, the new active MP does not have to rely on information received from the router's neighboring network devices to build the multicast routing state information. This further enables the upgrade to be performed without interrupting multicast routing services provided by the router.

Additionally, embodiments of the present invention do not have to rely on using the GenID mechanism to build multicast state information. When a standby MP becomes an active MP due to a switchover, the new active MP already has sufficient multicast information, received using bicasting and/or incremental updates, which enable the new active MP to provide multicast routing services without any interruption. The new active MP does not have to receive any multicast information from neighboring network devices in order to build its multicast state information. In fact, there is no need to even change the GenID upon a switchover. By not relying on the GenID, the router does not have to care whether its neighboring devices support GenID.

From the neighbors' perspective, the neighboring network devices do not need to support the GenID concept. Since the GenID is not changed, the switchover is transparent to the neighbors and as a result less processing is required by the neighbors. A neighbor may not even know that a switchover has occurred and no coordination or information is needed from the outside world. This reduces the processing burden on neighboring network devices since they can continue to perform their processing in a normal manner and do not have to undertake any special processing to another neighbor network device building its multicast routing information. Further, due to non-reliance on neighboring network devices, the router performing a switchover is not affected by any problems that may occur in the neighbor routers or in receiving information from the neighbors.

The processing described above with respect to FIG. 6 is for performing a hitless upgrade using a switchover. A switchover may also be caused by other events not related to a software upgrade. As an example, a voluntary failover may be initiated by the system administrator upon noticing a performance degradation on the active MP or upon noticing that software executed by the active partition is malfunctioning. In such instances, the network administrator may voluntarily issue a command for a failover with the hope that problems associated with the active MP will be remedied when the standby MP becomes the new active MP. An involuntary switchover may occur due to some critical failure in the active MP such as when a hardware watchdog timer goes off (or times out) and resets the active MP, a problem occurs in the kernel of the operating system loaded for the active MP, critical failure of software executed by the active MP, loss of heartbeat, and the like.

Figure 10:
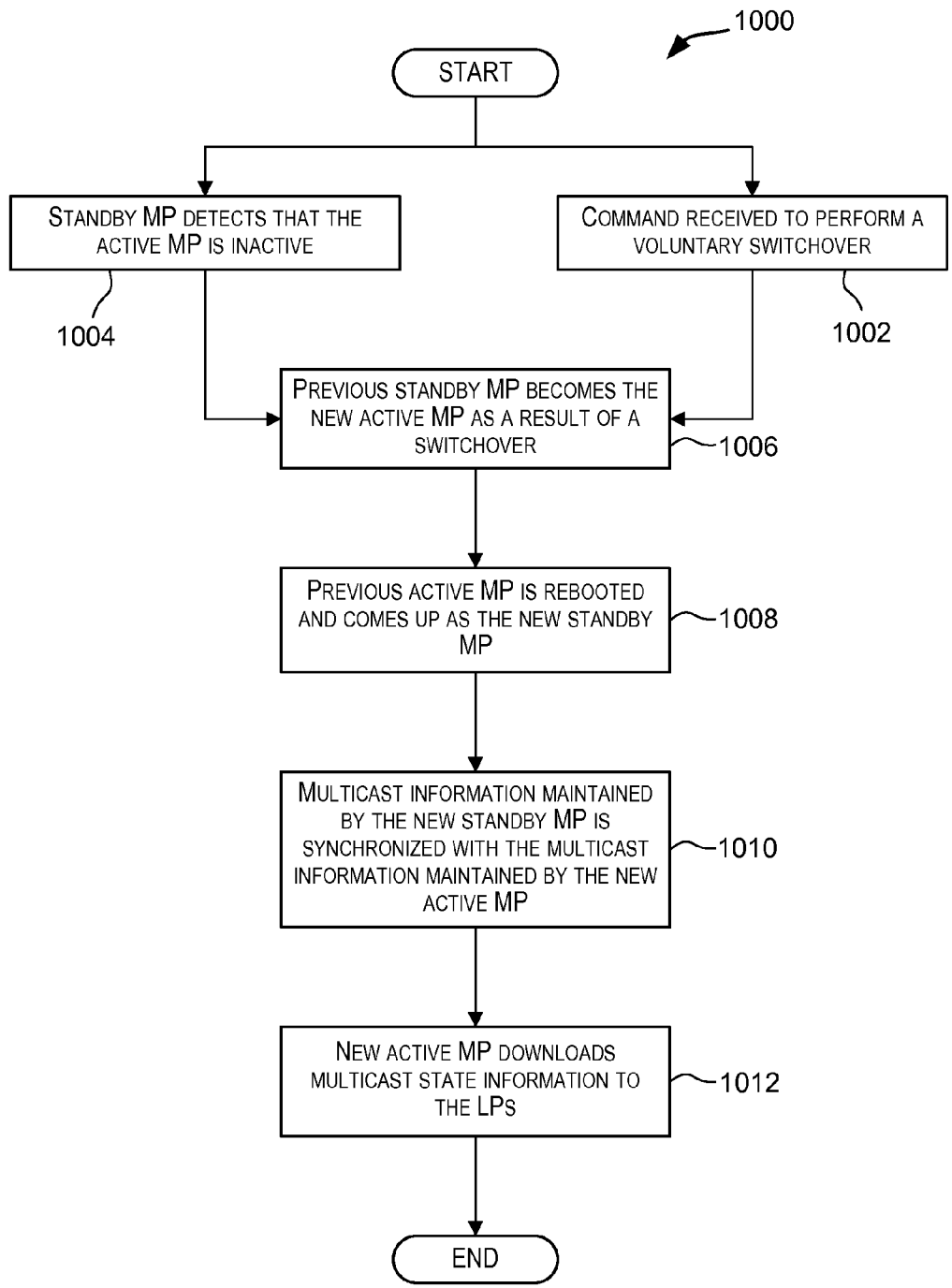
FIG. 10 depicts a simplified flowchart showing processing performed in response to an involuntary or voluntary (not related to software upgrade) switchover according to an embodiment of the present invention.

FIG. 10 depicts a simplified flowchart 1000 showing processing performed in response to an involuntary or voluntary (not related to software upgrade) switchover according to an embodiment of the present invention. The processing depicted in FIG. 10 may be performed using software (e.g., code, instructions, program) executed by the standby MP and active MP, using hardware, or combinations thereof. The software may be stored on a non-transitory computer-readable storage medium. The particular series of processing steps depicted in FIG. 10 is not intended to limit the scope of embodiments of the present invention.

As depicted in FIG. 10, processing may be initiated either due to a command received to perform a voluntary switchover (step 1002) or when the standby MP detects that the active MP is inactive or down (step 1004). A switchover is performed due to which the standby MP becomes the new active MP (step 1006). In one embodiment, processing performed in 1006 is same as processing performed in step 614 of FIG. 6 and described above. It is to be noted that in 1006 that the previous standby MP 614 already maintains multicast information that has been synchronized with the previous active MP either using incremental updates (e.g., PIM mcache information, BSR state information, RPSet information) and bicasting (PIM neighbor information, IGMP information). The new active MP thus does not have to build the multicast information from scratch. Additional multicast information that may be used by the new active MP for multicast routing may be built using this available information. The building of the multicast routing state for the new active MP does not have to depend upon information received from neighboring network devices or routers.

The previous active MP is then rebooted and comes up as the new standby MP (step 1008). The multicast information maintained by the new standby MP is then synchronized with the multicast information maintained by the new active MP (step 1010). Synchronization in 1010 may be performed using incremental updates and bicasting, as previously described.

While the switchover processing described above is being performed, the linecard processors on the linecards are not aware of the switchover. The linecards continue to perform hardware-based forwarding as before the switchover. The new active MP then download its multicast information to each LP (step 1012).

In one embodiment, the following switchover-related operations may be performed: hitless software upgrade, voluntary MP switchover, and involuntary MP switchover. The hitless software upgrade has been described above with respect to FIG. 6 and the voluntary/involuntary switchovers (not related to upgrade) have been described above with respect to FIG. 10. In one embodiment, in the voluntary MP switchover and the involuntary MP switchover operations, the LPs are unaffected and as a result rebooting of the LPs is not performed. In the voluntary MP switchover and the involuntary MP switchover operations, once the new active MP takes over, and detects the one or more LPs, the new active MP will start downloading multicast state information to the one or more LPs without rebooting the LPs.

In both the flowcharts depicted in FIGS. 6 and 10, when a switchover is performed and the standby MP becomes the new active MP, the new active MP already has multicast information that was synchronized when the MP was operating in standby mode. For example, the new active MP already has PIM mcache information, BSR state information, and RPSet information that was synchronized with the previous active MP. The new active MP also already has PIM neighbor information and IGMP information that was synchronized using bicasting. Accordingly, the new active MP already has multicast information available that it can use to provide multicast routing services without interruption. This is referred to as a hot standby solution wherein the standby MP already has synchronized multicast information that it can start using when it becomes the active MP. This enables the network device to continue to provide multicast routing services without interruption. This is in contrast to conventional solutions wherein the new active MP has to rebuild the multicast information from scratch (referred to as cold standby) and has to build its multicast information based upon information received from its neighbors. Due to this conventional solutions are unable to provide uninterrupted multicast routing services.

Linecard Processing

The multicast information maintained by a linecard comprises software multicast state information and hardware multicast state information. The software multicast state information is the multicast information maintained by an LP in a volatile memory associated with the LP. For example, referring to FIG. 2, the software multicast state information is information 201 maintained in volatile memory 204. The multicast information maintained by hardware resources (e.g., packet processor 210 and associated memories CAM 212 and PRAM 214) of a linecard that are configured to perform multicast packet forwarding is referred to as hardware multicast state information. This information includes multicast information maintained in CAM 212, PRAM 214, MVID table 217 and replication table 216.

As described above, forwarding identifiers and MVIDs are used for performing egress forwarding of multicast packets. Allocation and management of the forwarding identifiers and MVIDs is performed by the active MP. When a switchover occurs and a new active MP takes over, the LP of a linecard needs to use the same forwarding identifiers and MVIDs that were being used prior to the switchover. However, when a standby MP becomes the active MP, all the forwarding identifiers and MVIDs are initially free. When the new active MP takes over management of hardware resources after a switchover, it is provided information regarding the mapping of forwarding identifiers to output ports/interfaces (OIFs). After the standby MP takes over as active, the mcache information maintained by the active MP is used to reserve the forwarding identifiers and MVIDs.

A forwarding identifier identifies a set of one or more output ports of the router to which the packet is to be forwarded. Since a unicast packet has only one destination and is sent to only one output port, the forwarding identifier for a unicast packet identifies a single output port. Accordingly, for unicast routing, the number of forwarding identifiers that are needed is limited to the number of ports available in the router. However, in the case of a multicast packet, there can be multiple destinations and as a result the forwarding identifier for a multicast packet typically identifies multiple ports and combinations of ports. As a result, forwarding identifiers for multicast packets are managed dynamically. For example, when a new port or output interface is added, a request for a new forwarding identifier is made and it is mapped to the new output port. This mapping is done by the active MP. The active MP thus needs to have knowledge about allocated forwarding identifiers and their mapping to output ports.

There are various situations as a result of which one or more LPs of a network device may have to synchronize their multicast information with multicast information maintained by the active MP. Examples of such situations include (1) when the LP performs a cold reboot, (2) when an LP detects that an MP switchover has occurred, or (3) when an LP reboots as part of a hitless software upgrade. Each of these scenarios is explained below.

Figure 7:
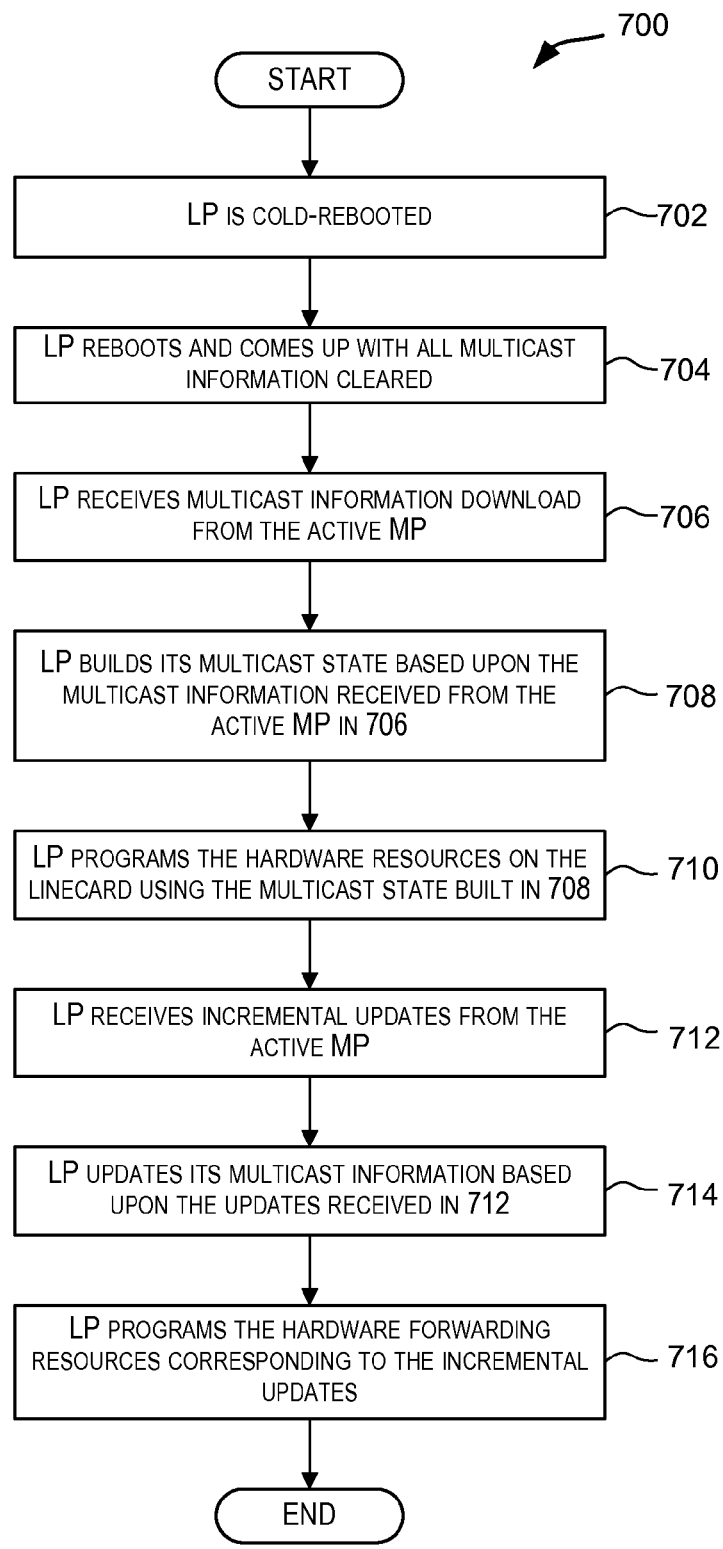
FIG. 7 depicts a simplified high level flowchart depicting processing that may be performed when a linecard processor is cold rebooted according to an embodiment of the present invention.

When a cold reboot of an LP is performed, after the reboot the LP loses all its multicast information and comes up with a blank slate. FIG. 7 depicts a simplified high level flowchart 700 depicting processing that may be performed when an LP is cold rebooted according to an embodiment of the present invention. The processing depicted in FIG. 7 may be performed using software (e.g., code, instructions, program) executed by the LP. The software may be stored on a non-transitory computer-readable storage medium. The particular series of processing steps depicted in FIG. 7 is not intended to limit the scope of embodiments of the present invention.

The processing may be initiated when an LP is cold rebooted (step 702). The LP then reboots and comes up with all its multicast information, including software multicast state information and hardware multicast state information, cleared (step 704). The rebooted LP then receives a download of multicast information from the active MP (step 706). In one embodiment, the multicast information downloaded in 706 includes information related to PIM mcache information and RPSet information. Other multicast-related information may be downloaded in alternative embodiments. The LP uses the information downloaded by the active MP to build its software multicast state (step 708). The LP then uses the multicast routes information (e.g., the PIM mcache information) built in 708 (or downloaded in 706) to program the hardware resources on the linecard to enable the hardware resources to perform multicast forwarding (step 710). The hardware resources that are programmed in 706 may include CAM 212, PRAM 214, MVID table 217, and replication table 216. Accordingly, in 710, the hardware multicast state information is built.

Subsequent to initial download and building of multicast information and the programming of the hardware resources, the LP may incrementally receive multicast information updates from the active MP when changes (e.g., a new entry is added, an entry is deleted, and entry is modified) occur to the multicast information maintained by the active MP (step 712). The LP may then make changes to its multicast information based upon the updates received in 712 (step 714). The LP may then program the hardware forwarding resources corresponding to the incremental updates (step 716). Steps 712, 714, and 716 may be repeated multiple times as changes are made to the multicast information.

In one embodiment, correlation information is maintained that correlates the software multicast state information maintained by an LP with the hardware multicast state information used by the hardware resources of a linecard to perform forwarding of multicast packets. The correlation information may comprise pointers or links or indices linking the software information with the hardware information. In one embodiment, the correlation links are memory addresses or handles into the packet processor memory where the corresponding resources are programmed. For example, when a multicast route entry is programmed into a CAM associated with a packet processor, the address of the CAM location where the entry is programmed is determined. This address represents a "handle" that can be used to refer to this programmed entry, in case the CAM entry is to be updated or deleted. This handle is usually stored in the software route entry (in the case of multicast information, the mcache entry) that represents the CAM entry. When a soft-reset is performed on an LP, the software multicast information is cleared and thus lost. However, the CAM information (which is part of the hardware multicast information) is preserved. Accordingly, the handles need to be stored in non-volatile memory, so that when the LP rebuilds its software multicast information and recreates the mcache entries, the stored correlation information can be used to link the software multicast information (e.g., the mcache entries) with the hardware multicast information.

Considering that mcache entries are represented by a source and a multicast group, (S, G), the correlation information that is stored comprises information that map an (S, G) entry to its CAM handle. Similarly, the MVID, the forwarding identifier, and the replication offset (this last information is per outgoing port of an entry) all represent various locations in their corresponding tables in the packet processor, all of which is used for the complete replication and forwarding of the (S, G) stream. Once the LP comes back up and the software mcache state is re-created, this mapping information is used to attach the software entry to their hardware handles. The correlation information thus represents information that connects the software multicast information to the hardware multicast routing information.

Figure 8:
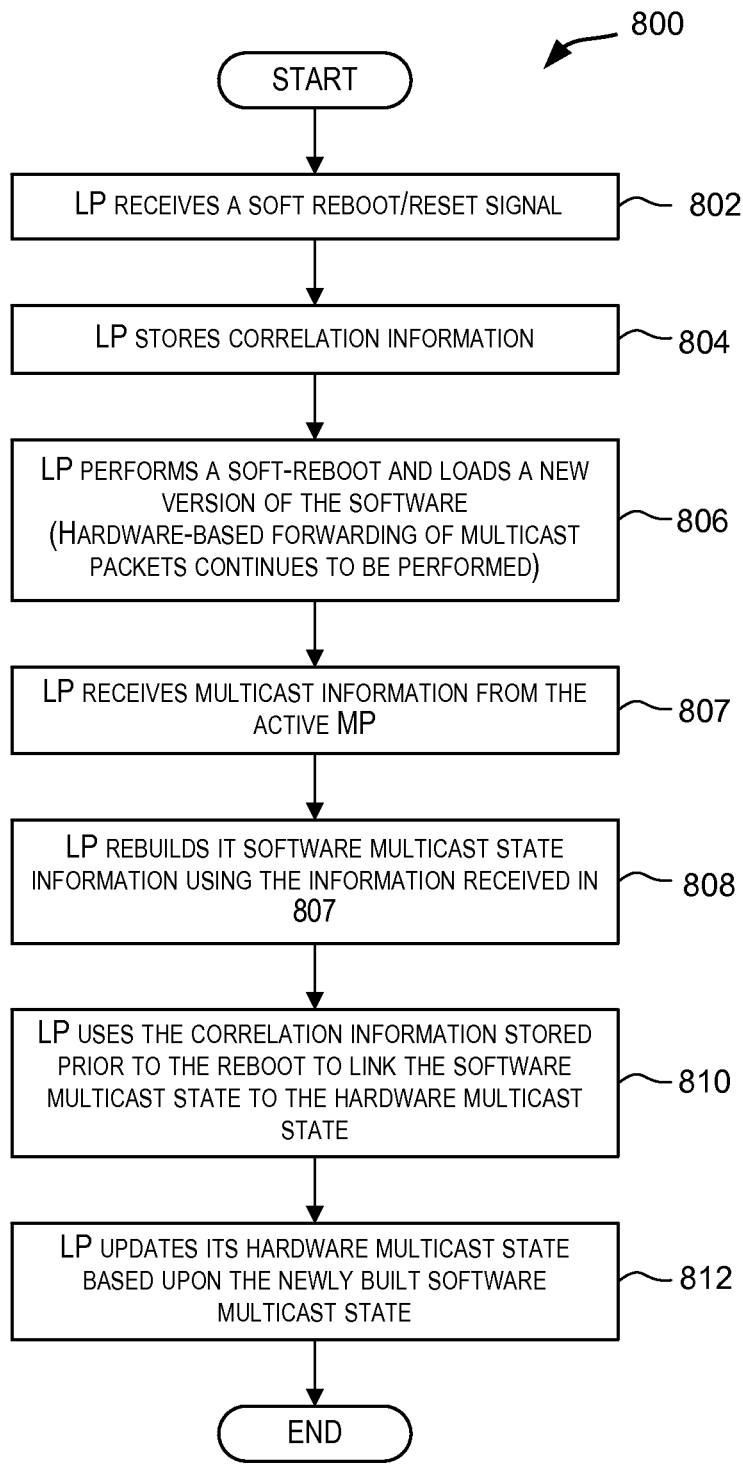
FIG. 8 depicts a simplified flowchart depicting processing performed when a software upgrade process is performed according to an embodiment of the present invention.

Another situation where an LP may have to synchronize its multicast information state with that maintained by an active MP is during a hitless upgrade procedure. FIG. 8 depicts a simplified flowchart 800 depicting processing performed when a software upgrade process is performed according to an embodiment of the present invention. The processing depicted in FIG. 8 may be performed using software (e.g., code, instructions, program) executed by the LP. The software may be stored on a non-transitory computer-readable storage medium. The particular series of processing steps depicted in FIG. 8 is not intended to limit the scope of embodiments of the present invention.

As depicted in FIG. 8, processing may be initiated when an LP receives a soft-reset signal (step 802). This reset signal may be received as part of a hitless software upgrade process. The LP then stores the correlation information to non-volatile memory or to memory that is not cleared due to a soft-reset of the LP (step 804). Accordingly, in 804, the correlation information is stored in such a way that it is preserved across a reboot and available to the LP after the reboot. As described above, the correlation information provides the link between the software multicast information maintained by the LP in volatile memory and the hardware multicast information used by the hardware resources (e.g., packet processor and associated memories) to perform multicast packet forwarding. In one embodiment, as part of 804, the LP goes through the mcache entries in mcache information 206, and for each mcache entry, stores information that maps the mcache entry to a location in the CAM (CAM address or called CAM index) storing information for the mcache entry. In one embodiment, the correlation information is saved to non-volatile memory 234, from where it can be read back after the LP reboots.

In one embodiment, a portion of memory 204 may be set aside as protected memory 208, wherein information stored in the protected memory is preserved across a soft reboot. In such an embodiment, the correlation information may be stored in protected memory 208. It is to be noted that during this time, the hardware-based forwarding (i.e., forwarding performed by packet processor 210 using CAM 212, PRAM 214, MVID table 217, and replication table 216) of multicast traffic continues without interruption.

The LP then performs a soft-reboot and loads a new version of the software (step 806). In a soft-reboot of a linecard, power to the linecard is not cycled. The new version of software may be executed by the LP and loaded in volatile memory 204 associated with the LP. As a result of the reboot performed in 806, the software multicast information maintained by the LP in volatile memory (but not in protected memory 208) prior to the reboot is cleared.

It is to be noted that, since power to the linecard is not cycled in a soft-reboot, a soft-reset of the LP does not affect the hardware multicast information maintained by the hardware resources (e.g., packet processor and associated memories) of the linecard. The hardware multicast information is preserved across a soft-reboot and is used by the hardware resources to continue performing forwarding of multicast packets without interruption.

The LP then receives multicast information from the active MP (step 807). In one embodiment, the multicast information received in 807 includes information related to PIM mcache information and RPSet information. The LP uses the information received in 807 to build its software multicast state (step 808). For example, as part of 808, the LP builds a PIM mcache table comprising mcache entries.

The LP then uses the correlation information, which was stored in 804 prior to the reboot, to link the software multicast information built in 808 to the hardware multicast information (step 810). The LP then updates the hardware multicast state based upon the software multicast state built in 808 (step 812). For example, the multicast software state information built in 808 may be used to update the CAM, PRAM, MVID table, and replication table information. For example, if there are discrepancies in the hardware multicast forwarding state as a result of the new software state, then these discrepancies are corrected in 812. In one embodiment, any conflicts are resolved by updating the hardware multicast information. Any hardware multicast information entries that did not change during the software upgrade process will continue to be forwarded uninterrupted and will not take an unnecessary hit. This marks the end of the LP upgrade.

Figure 9:
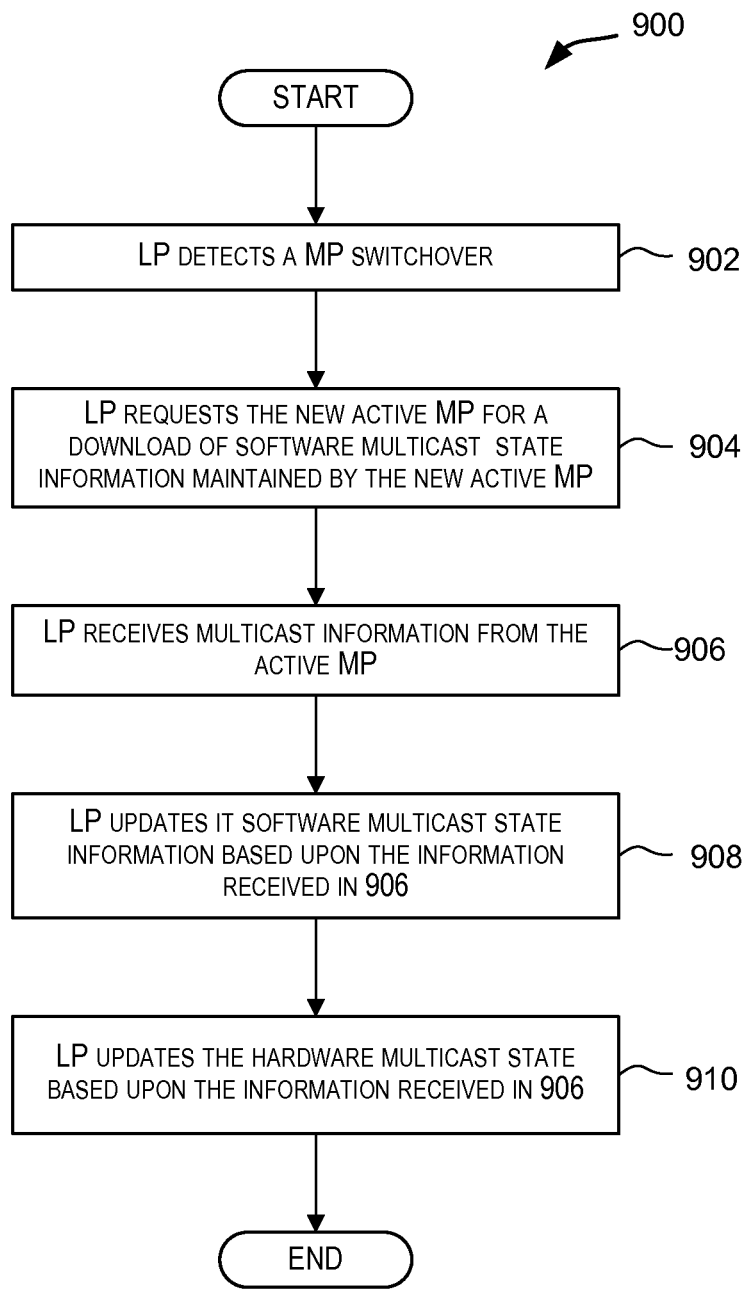
FIG. 9 depicts a simplified flowchart depicting processing performed when a linecard processor detects a management processor switchover, which is not part of a software upgrade, according to an embodiment of the present invention.

Another scenario where the multicast information maintained on a linecard may be affected is when an LP detects that an MP switchover has occurred, which is not part of a software upgrade operation. FIG. 9 depicts a simplified flowchart 900 depicting processing performed when an LP detects an MP switchover, which is not part of a software upgrade, according to an embodiment of the present invention. The processing depicted in FIG. 9 may be performed using software (e.g., code, instructions, program) executed by the LP. The software may be stored on a non-transitory computer-readable storage medium. The particular series of processing steps depicted in FIG. 9 is not intended to limit the scope of embodiments of the present invention.

As depicted in FIG. 9, processing is initiated when an LP detects that an MP switchover has happened (step 902). The LP then requests the new active MP (previously standby) for a download of software multicast information maintained by the active MP (step 904). The LP then receives the software multicast state information from the active MP (step 906). The information received in 906 may include PIM mcache information, RPSet information, and BSR state information.

The LP then updates the software multicast information maintained by the LP based upon the multicast information received in 906 from the active MP (step 908). It is to be noted that since the LP has not been rebooted, the software multicast information maintained by the LP and the hardware multicast information used for forwarding of multicast packets by hardware resources (e.g., packet processor on a linecard) on the linecard is still intact. Accordingly, upon receiving the multicast information from the active MP, the LP updates its own software multicast information only if the new information received in 906 differs from the software multicast information the LP was already maintaining.

In one scenario, it is possible that the multicast information maintained by the new active MP has changed from the multicast information maintained by the LP. For example, it is possible that new active MP's version of the mcache information might not have some mcache entries present in the mcache information maintained by the LP. This may, for example, happen if the MP switchover happened at the exact time of the deletion of the mcache entries at the MP. In order to identify such mcache entries, prior to the LP requesting software multicast information from the active MP (i.e., before step 904), the LP traverses through all its maintained list of mcache entries and marks each as "to be deleted". Upon receiving the multicast information from the active MP in 906, in 908, the LP refreshes each of its mcache entries if a corresponding entry exists in the information received from the active MP. When an mcache entry is refreshed, the "to be deleted" mark associated with the entry is cleared. Once the complete refresh finishes, the LP traverses its mcache entries again and deletes any mcache entry that still has an associated "to be deleted" mark (these entries are those that were not refreshed based upon information received from the active MP). This processing ensures that any mcache entry that did not change during the switchover will continue to be used for forwarding uninterrupted, and will not take an unnecessary hit.

The LP then updates the hardware multicast information based upon the information received in 906 (step 910). As with the software mcache entries, only those portions of the hardware multicast information that have changed, based upon the information received in 906, are updated.

It is to be noted that since the LP never went down in this scenario, while steps 902, 904, 906, and 908 are being performed, the hardware continues to forward multicast traffic uninterrupted using its existing hardware multicast state information. Even in 910, forwarding of multicast traffic continues uninterrupted for multicast routes that have not changed from prior to the switchover.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A method comprising:
   selectively bicasting a multicast protocol-related packet, received at a processing component of a network device, to a first processor and a second processor based upon a multicast protocol-related packet type, wherein selectively bicasting comprises:
   upon determining the multicast protocol-related packet to be of a first type,
      sending, from the processing component, a copy of the multicast protocol-related packet to the first processor operating in active mode, the first processor performing a set of multicast routing-related functions in the active mode, and
      sending, from the processing component, a copy of the multicast protocol-related packet to the second processor operating in standby mode, the second processor not performing the set of multicast routing-related functions in the standby mode;
   updating, by the first processor, first multicast information maintained by the first processor based upon the copy of the multicast protocol-related packet received by the first processor; and
   updating, by the second processor, second multicast information maintained by the second processor based upon the copy of the multicast protocol-related packet received by the second processor.

2. The method of claim 1 wherein the multicast protocol-related packet is a Protocol Independent Multicast (PIM) packet.

3. The method of claim 2 wherein the first multicast information updated by the first processor comprises information related to neighbors of the network device that support PIM protocol.

4. The method of claim 1 wherein the multicast protocol-related packet is an Internet Group Membership Protocol (IGMP) packet.

5. The method of claim 4 wherein the first multicast information updated by the first processor comprises information related to the IGMP.

6. The method of claim 1 further comprising:
   communicating update information from the first processor to the second processor, the update information comprising information indicative of a change made to the first multicast information; and
   updating the second multicast information based upon the update information.

7. A network device comprising:
   a processing component;
   a first processor and a second processor;
      wherein the processing component is operable to determine whether a multicast protocol-related packet is of a first type, and upon determining that the multicast-protocol related packet is of the first type, to send a copy of the multicast protocol-related packet to the first processor, and a copy of the multicast protocol-related packet to the second processor;
   the first processor configurable to operate in an active mode, wherein the first processor is configurable to perform a set of multicast routing-related functions in the active mode; and
   the second processor configurable to operate in a standby mode when the first processor is operating in the active mode, wherein the second processor is configurable to not perform the set of multicast routing-related functions in the standby mode;

wherein the first processor is further configurable to:
- receive, from the processing component, a copy of the multicast protocol-related packet; and
- update first multicast information maintained by the first processor based upon the copy of the multicast protocol-related packet received by the first processor, the first multicast information used by the first processor for performing the set of multicast routing-related functions;

wherein the second processor is further configurable to:
- receive, from the processing component, a copy of the multicast protocol-related packet; and
- update second multicast information maintained by the second processor based upon the copy of the multicast protocol-related packet received by the second processor.

8. The network device of claim 7 further comprising a linecard, wherein the linecard comprises the processing component.

9. The network device of claim 7 wherein the multicast protocol-related packet is a Protocol Independent Multicast (PIM) packet.

10. The network device of claim 9 wherein the first multicast information updated by the first processor comprises information related to neighbors of the network device that support PIM protocol.

11. The network device of claim 7 wherein the multicast protocol-related packet is an Internet Group Membership Protocol (IGMP) packet.

12. The network device of claim 11 wherein the first multicast information updated by the first processor comprises information related to the IGMP.

13. The network device of claim 7 wherein:
- the first processor is configurable to communicate update information to the second processor, the update information comprising information indicative of a change made to the first multicast information; and
- the second processor is configurable to update the second multicast information based upon the update information.

* * * * *